US008391843B2

(12) United States Patent
Lee et al.

(10) Patent No.: US 8,391,843 B2
(45) Date of Patent: Mar. 5, 2013

(54) METHOD FOR CONTROLLING USER INTERFACE MENU, AND MOBILE TERMINAL AND DEVICE FOR PROVIDING APPLICATION SERVICE USING THE SAME

(75) Inventors: Seung-Youl Lee, Goyang-si (KR); One-Hark Jang, Seoul (KR); Bong-Nam Joo, Goyang-si (KR); Hak-Jun Kim, Seoul (KR)

(73) Assignee: KT Corporation, Seongnam (KR)

( * ) Notice: Subject to any disclaimer, the term of this patent is extended or adjusted under 35 U.S.C. 154(b) by 468 days.

(21) Appl. No.: 12/234,238

(22) Filed: Sep. 19, 2008

(65) Prior Publication Data

US 2009/0075633 A1    Mar. 19, 2009

Related U.S. Application Data

(63) Continuation of application No. PCT/KR2007/001337, filed on Mar. 19, 2007.

(30) Foreign Application Priority Data

Mar. 20, 2006  (KR) .................. 10-2006-0025165
Mar. 16, 2007  (KR) .................. 10-2007-0025801

(51) Int. Cl.
*H04M 1/725* (2006.01)
(52) U.S. Cl. ............ 455/412.2; 455/412.1; 455/414.1; 455/466
(58) Field of Classification Search ............ 455/412.2
See application file for complete search history.

(56) References Cited

U.S. PATENT DOCUMENTS

| | | | |
|---|---|---|---|
| 6,167,255 A | 12/2000 | Kennedy, III et al. | |
| 7,679,649 B2 * | 3/2010 | Ralston et al. | 348/211.3 |
| 2002/0091797 A1 * | 7/2002 | Wallenius et al. | 709/218 |
| 2002/0119793 A1 | 8/2002 | Hronek et al. | |
| 2004/0013246 A1 | 1/2004 | Back et al. | |
| 2004/0037269 A1 * | 2/2004 | Lundin | 370/352 |
| 2005/0015444 A1 * | 1/2005 | Rambo | 709/204 |
| 2005/0100313 A1 | 5/2005 | Wang | |
| 2005/0277432 A1 * | 12/2005 | Viana et al. | 455/466 |
| 2006/0184934 A1 * | 8/2006 | Karlberg | 717/178 |

FOREIGN PATENT DOCUMENTS

| | | |
|---|---|---|
| KR | 10-2003-0008009 A | 1/2003 |
| KR | 10-2006-0022179 A | 3/2006 |

OTHER PUBLICATIONS

International Search Report for International Application No. PCT/KR2007/001337 dated Jul. 11, 2007 by Korean Intellectual Property Office.
Supplementary European Search Report dated May 15, 2012.
Abstract of European Search Report, dated May 15, 2012.

* cited by examiner

*Primary Examiner* — Charles Appiah
*Assistant Examiner* — Mazda Sabouri
(74) *Attorney, Agent, or Firm* — Sughrue Mion, PLLC

(57) ABSTRACT

A method of controlling a user interface menu and a mobile communication terminal and a device for providing application service are disclosed. According to one embodiment of the present invention, the method of controlling the user interface menu can include receiving user interface menu forming information from the application service providing device if a call is connected between the mobile communication terminal and the application service providing device through the mobile communication system; extracting menu component data corresponding to a set user interface menu if the menu forming information; and combining the extracted menu component data and forming the user interface menu to be provided per the service attribute.

31 Claims, 14 Drawing Sheets

METHOD FOR CONTROLLING USER INTERFACE MENU, AND MOBILE TERMINAL AND DEVICE FOR PROVIDING APPLICATION SERVICE USING THE SAME

RELATED APPLICATIONS

This application is a continuation application, and claims the benefit under 35 U.S.C. §§120 and 365 of PCT Application No. PCT/KR2007/001337, filed on Mar. 19, 2007, which is hereby incorporated by reference.

BACKGROUND OF THE INVENTION

1. Field of the Invention

The present invention relates to a method of controlling a user interface menu and a mobile communication terminal and a device for providing an application service, applied with the control method. More specifically, the invention relates to a method of controlling a user interface menu for an application service and a mobile communication terminal and a device for providing the application service, applied with the control method, which can promote user's convenience by changing a user interface menu in accordance with an application service provided from a wideband code division multiple access (WCDMA) network.

2. Description of the Related Technology

The mobile communication service started from the first generation mobile communication service mainly based on low-quality voice telephony, provided from an advanced mobile phone service (AMPS) of an analog cellular type, serviced in the late 1980's. Then, the mobile communication service developed to the second generation mobile communication service capable of providing improved voice telephony and low speed (14.4 Kbps) data service by using a global system for a mobile (GSM), a code division multiple access (CDMA) and a time division multiple access (TDMA) of a digital cellular type. The mobile communication service has currently prepared the third generation mobile communication, divided into a WCDMA system of an asynchronous type, suggested based on a 3 generation partnership project (GPP), and a CDMA-2000 of a synchronous type, suggested based on a 3GPP2.

Among the aforementioned mobile communication services, the WCDMA system, which is a wireless protocol recommended in IMT-2000, has high call quality and is adequate for transmission of huge amounts of data due to the use of a spread-spectrum method. The WCDMA system also supports high level mobility. Accordingly, a lot of communication service providers in the world have been currently being provided or prepared their services by using the IMT-2000 and have got the technology specification for the WCDMA to be in continuous evolution from the 3GPP established by many institutes.

SUMMARY OF CERTAIN INVENTIVE ASPECTS

One aspect of the invention is a menu that can be varied depending on the attributes of each application service and can control a function of a mobile communication terminal, for a user using the application service, to solve user's inconvenience and to provide more improved service.

Another aspect of the invention is a method for controlling a user interface menu and a mobile terminal applied with the control method, which can promote user's convenience by changing a user interface menu in accordance with the attributes of an application service provided from a mobile communication network. Another aspect of the present invention is a method for controlling a user interface menu in a mobile communication terminal can include setting a user interface menu, to be provided when the pertinent application service is selected, per service attribute of the application services provided to the mobile communication terminal; receiving a service attribute notifying message notifying the service attribute of the application service from the application service providing device if a call is connected between the mobile communication terminal and the application service providing device through the mobile communication system; searching a menu corresponding to the received service attribute in the menu set per service attribute if the service attribute notifying message is received; and changing the user interface menu to the searched menu.

Another aspect of the invention is a method for controlling a user interface menu which can include receiving user interface menu forming information from the application service providing device if a call is connected between the mobile communication terminal and the application service providing device through the mobile communication system; extracting menu component data corresponding to a set user interface menu if the menu forming information is received; and combining the extracted menu component data and forming the user interface menu to be provided per service attribute.

Another aspect of the present invention is a mobile communication terminal which can include a wireless communication unit, requesting an application service to an application service providing device through a mobile communication system and receiving service data and a service attribute notifying message, notifying the attribute of provided service, from the application service providing device; an input unit, including a plurality of input keys and inputting user's selection and command; a storing unit, storing user interface menu data including a menu title corresponding to each service attribute per service attribute of the application service and a command and function information to be performed corresponding to the pertinent menu title; a control unit, searching menu data corresponding to received service attribute in the storing unit if the service attribute notifying message is received after requesting the application service through the wireless communication unit, changing the user interface menu in the terminal to the searched menu and performing a function corresponding to the user interface menu selected according to user request though the input unit; and a displaying unit, displaying the user interface screen, changed according to the control of the control unit, and the user interface menu.

Another aspect of the present invention is a mobile communication terminal which can include a wireless communication unit, requesting an application service to an application service providing device through a mobile communication system and receiving service data and user interface menu forming information corresponding to the attribute of a provided service; an input unit, including a plurality of input keys and inputting user's selection and command; a storing unit, storing menu component data including a command and function information to be performed in a element of each menu to form a menu corresponding to each service attribute per service attribute of the application service; a control unit, extracting the menu component data corresponding to received menu forming information if the menu forming information is received, forming the user interface menu and performing a function corresponding to the user interface menu selected according to user request though the input unit; and a displaying unit, displaying the formed user interface menu.

Another aspect of the present invention is a method for controlling a user interface menu in an application service providing device which can include classifying service attribute per type of the application service and per operating mode of each service; connecting a call between the application service providing device and the mobile communication terminal in accordance with a call request from the mobile communication terminal; receiving a service request from the pertinent mobile communication terminal through the connected call; checking the service attribute corresponding to the call request from the mobile communication terminal; and transmitting information related to the service attribute and user interface menu forming information corresponding to the service attribute to the mobile communication terminal.

Another aspect of the present invention is a method for controlling a user interface menu in an application service providing device which can include classifying service attribute per type of the application service and per operating mode of each service; storing user interface menu forming information corresponding to the service attribute; connecting a call between the application service providing device and the mobile communication terminal in accordance with a call request from the mobile communication terminal; receiving a service request from the pertinent mobile communication terminal through the connected call; checking the service attribute corresponding to the call request from the mobile communication terminal; and transmitting the user interface menu forming information corresponding to the service attribute to the mobile communication terminal.

Another aspect of the present invention is an application service providing device applied with a method for controlling a user interface menu which can include an input signal receiving unit, receiving an input signal of a user from the mobile communication terminal; an application service processing unit, performing the application service processing to provide the application service corresponding to the input signal; and a user interface menu information transmitting unit, transmitting service attribute information and user interface menu forming information for forming a user interface menu on the mobile communication terminal per attribute of the application service.

Another aspect of the invention is a method of controlling a user interface menu in a mobile communication terminal, which accesses an application service providing device via a mobile communication system and uses at least one type of application service, the method comprising: setting a user interface menu, to be provided when a pertinent application service is selected, per service attribute of application services provided to the mobile communication terminal; receiving a service attribute notifying message from the application service providing device upon connection of a call between the mobile communication terminal and the application service providing device via the mobile communication system, wherein the service attribute notifying message is configured to notify the service attribute of the pertinent application service; searching a menu corresponding to the received service attribute upon receipt of the service attribute notifying message; and changing the user interface menu to the searched menu.

The above method further comprises forming the user interface menu as a default menu if the service attribute notifying message is not received from the application service providing device or if the service attribute notifying message is received from the application service providing device but there is no menu corresponding to the received service attribute in the menu set per service attribute.

Another aspect of the invention is a method of controlling a user interface menu in a mobile communication terminal, which accesses an application service providing device via a mobile communication system and uses at least one type of application service, the method comprising: receiving user interface menu forming information from the application service providing device if a call is connected between the mobile communication terminal and the application service providing device via the mobile communication system; extracting menu component data corresponding to a set user interface menu if the menu forming information is received; and combining the extracted menu component data so as to form the user interface menu to be provided per service attribute.

The above method further comprises storing menu component data, which is a command and function information of each menu forming the user interface menu, before receiving the user interface menu forming information. The method further comprises allowing the set user interface menu forming information to be stored by the application service providing device before receiving the user interface menu forming information. In the above method, if the application service providing device is a voice service providing device, the receiving of the user interface menu forming information comprises: requesting to transmit a short message including the menu forming information to a short message service center (SMSC) by way of the application service providing device; receiving the short message including the menu forming information from the SMSC; checking the attribute of the received short message; determining whether the short message includes the menu forming information based on checking the attribute of the short message; and extracting the menu forming information from the short message.

In the above method, the short message designates a specific data field and displays the attribute representing that the short message includes the menu forming information. In the above method, the specific data field is a protocol identifier (PID) in a header fielder. The method further comprises forming the user interface menu as a default menu if the menu forming information is not received from the application service providing device or if the menu forming information is received from the application service providing device but the menu component data corresponding to the received menu forming information is not stored.

In the method, the application service is one of a video conference service provided from a wideband code division multiple access (WCDMA) mobile communication system, a video monitoring service, a voice conference service and an ARS service for a disabled person. In the above method, the attribute of the service, if the application service is the video conference service, comprises a video conference holding mode, being in operation for preparing a video conference, and a video conference busy line mode, being in operation of the video conference via a video telephony between participants. In the above method, if the service attribute is the video conference holding mode, the user interface menu is formed by including at least one of a call history view, accessing a call history stored in the mobile communication terminal to select the participants, and a phone list search, accessing a phone list registered in the mobile communication terminal to select the participants.

In the above method, if the service attribute is the video conference busy line mode, the user interface menu is formed by including at least one of secret communication, communicating with an only specific participant except for other participants, speech restriction, restricting the voice of a specific participant to be transferred to the other participants, and chatting, exchanging a text massage with a specific participant. In the above method, the attribute of the service, if the application service is the video monitoring service, comprises a video monitoring mode providing a monitoring video, gathered from the designated monitoring terminal, to the mobile communication terminal.

In the above method, if the service attribute is the video monitoring mode, the user interface menu is formed by including at least one of an expanding function, expanding a monitoring screen, a contracting function, contracting the monitoring screen, and a moving function, moving the monitoring screen in a specific direction such as left, light, upper and lower. In the above method, the user interface menu per attribute of the service comprises a menu title, to be displayed on a screen of the mobile communication terminal, and a command and function information, performed when each menu title is selected.

Another aspect of the invention is a mobile communication terminal, comprising: a wireless communication unit configured to i) request an application service to an application service providing device via a mobile communication system and ii) receive service data and a service attribute notifying message from the application service providing device, wherein the service attribute notifying message is configured to notify the service attribute of the requested application service; an input unit, including a plurality of input keys, configured to receive a user's selection and command; a storing unit configured to store user interface menu data per service attribute of the application service and a command and function information to be performed corresponding to the pertinent menu title, wherein the user interface menu data comprises a menu title corresponding to each service attribute; a control unit configured to i) search menu data corresponding to received service attribute in the storing unit upon receipt of the service attribute notifying message, ii) change the user interface menu in the terminal to the searched menu and iii) perform a function corresponding to the user interface menu selected according to the user's selection and command; and a displaying unit configured to display the user interface screen, changed according to the control of the control unit, and the user interface menu.

In the above mobile communication terminal, the user interface menu stored in the storing unit comprises a user interface menu for a video conference holding mode including at least one of a call history view, accessing a call history stored in the mobile communication terminal to select the participants, and a phone list search, accessing a phone list registered in the mobile communication terminal to select the participants.

In the above mobile communication terminal, the user interface menu stored in the storing unit comprises a user interface menu for a video conference busy line mode including at least one of secret communication, communicating with an only specific participant except for other participants, speech restriction, restricting the voice of a specific participant to be transferred to the other participants, and chatting, exchanging a text massage with a specific participant In the above mobile communication terminal, the user interface menu stored in the storing unit comprises a user interface menu for a video conference mode including at least one of an expanding function, expanding a monitoring screen, a contracting function, contracting the monitoring screen, and a moving function, moving the monitoring screen in a specific direction such as left, light, upper and lower.

Another aspect of the invention is a mobile communication terminal, comprising: a wireless communicator configured to i) request an application service to an application service providing device through a mobile communication system and ii) receive service data and user interface menu forming information corresponding to the attribute of a provided service; a receiver, comprising a plurality of input keys, configured to receive a user's selection and command; a memory configured to store menu component data including a command and function information to be performed in a element of each menu to form a menu corresponding to each service attribute per service attribute of the application service; a controller configured to i) extract the menu component data corresponding to received menu forming information upon receipt of the menu forming information, ii) form the user interface menu and iii) perform a function corresponding to the user interface menu selected according to the user's selection and command; and a display configured to display the formed user interface menu.

In the terminal, if the application service is the voice conference service, the wireless communicator is further configured to receive a short message including the menu forming information through a short message service center (SMSC), and the controller is further configured to i) check the attribute of the short message, upon determination that the short message includes the menu forming information, and ii) extract the menu forming information from the short message to form the user interface menu. In the terminal, the user interface menu is displayed on a pop-up window in a part of a screen of the display.

Another aspect of the invention is a method of controlling a user interface menu for providing an application service in an application service providing device, which provides the application service to a mobile communication terminal via a mobile communication system, the method comprising: classifying service attribute per type of the application service and per operating modes of each service; connecting a call between the application service providing device and the mobile communication terminal in accordance with a call request from the mobile communication terminal; receiving a service request from a mobile communication terminal through the connected call; checking the service attribute corresponding to the call request from the mobile communication terminal; and transmitting information, related to the service attribute and user interface menu forming information corresponding to the service attribute, to the mobile communication terminal.

Another aspect of the invention is a method of controlling a user interface menu for providing an application service in an application service providing device, which provides the application service to a mobile communication terminal via a mobile communication system, the method comprising: classifying service attribute per type of the application service and per operating mode of each service; storing user interface menu forming information corresponding to the service attribute; connecting a call between the application service providing device and the mobile communication terminal in accordance with a call request from the mobile communication terminal; receiving a service request from a mobile communication terminal through the connected call; checking the service attribute corresponding to the call request from the mobile communication terminal; and transmitting the user interface menu forming information corresponding to the service attribute to the mobile communication terminal.

In the above method, if the application service is a voice conference service, a short message including the information related to the service attribute and the user interface menu forming information corresponding to the service attribute is transmitted to the mobile communication terminal.

Another aspect of the invention is an application service providing device, which provides at least one type of application service to a mobile communication terminal via a mobile communication system, the device comprising: a receiver configured to receive an input signal of a user from the mobile communication terminal; a processor configured to provide the application service corresponding to the input signal; and a transmitter configured to transmit service attribute information and user interface menu forming information per attribute of the application service, wherein the user interface menu forming information is configured to form a user interface menu on the mobile communication terminal.

The above device further comprises a user interface menu forming information transmitting determining unit configured to i) determine whether to transmit the service attribute information or the user interface menu forming information, ii) check the received user input signal and iii) form the user interface menu. The above device further comprises a database configured to store the user interface menu forming information corresponding to the service attribute of the application service. The above device further comprises a short message service (SMS) request signal transmitting unit configured to transfer a short message including the user interface menu forming information to the mobile communication terminal if the application service providing device is a voice conference service device.

Another aspect of the invention is one or more processor-readable storage devices having processor-readable code, the processor-readable code which, when executed by one or more processors, performs a method of controlling a user interface menu in a mobile communication terminal, which accesses an application service providing device through a mobile communication system and uses at least one type of application service, the method comprising: setting a user interface menu to be provided when a pertinent application service is selected per service attribute of application services provided to the mobile communication terminal; receiving a service attribute notifying message from the application service providing device upon connection of a call between the mobile communication terminal and the application service providing device via the mobile communication system, wherein the service attribute notifying message is configured to notify the service attribute of the requested application service; searching a menu corresponding to the received service attribute among the menus per set service attribute upon receipt of the service attribute notifying message; and changing the user interface menu to the searched menu.

Still another aspect of the invention is one or more processor-readable storage devices having processor-readable code, the processor-readable code which, when executed by one or more processors, performs a method of controlling a user interface menu in a mobile communication terminal, which accesses an application service providing device via a mobile communication system and uses at least one type of application service, the method comprising: receiving user interface menu forming information from the application service providing device upon connection of a call between the mobile communication terminal and the application service providing device via the mobile communication system; extracting menu component data corresponding to a set user interface menu based on the user interface menu forming information; and combining the extracted menu component data so as to form the user interface menu to be provided per the service attribute.

Still another aspect of the invention is an apparatus for controlling a user interface menu in a mobile communication terminal, which accesses an application service providing device via a mobile communication system and uses at least one type of application service, the apparatus comprising: means for setting a user interface menu, to be provided when a pertinent application service is selected, per service attribute of application services provided to the mobile communication terminal; means for receiving a service attribute notifying message from the application service providing device upon connection of a call between the mobile communication terminal and the application service providing device via the mobile communication system, wherein the service attribute notifying message is configured to notify the service attribute of the pertinent application service; means for searching a menu corresponding to the received service attribute upon receipt of the service attribute notifying message; and means for changing the user interface menu to the searched menu.

DETAILED DESCRIPTION OF CERTAIN INVENTIVE EMBODIMENTS

Figure 1:
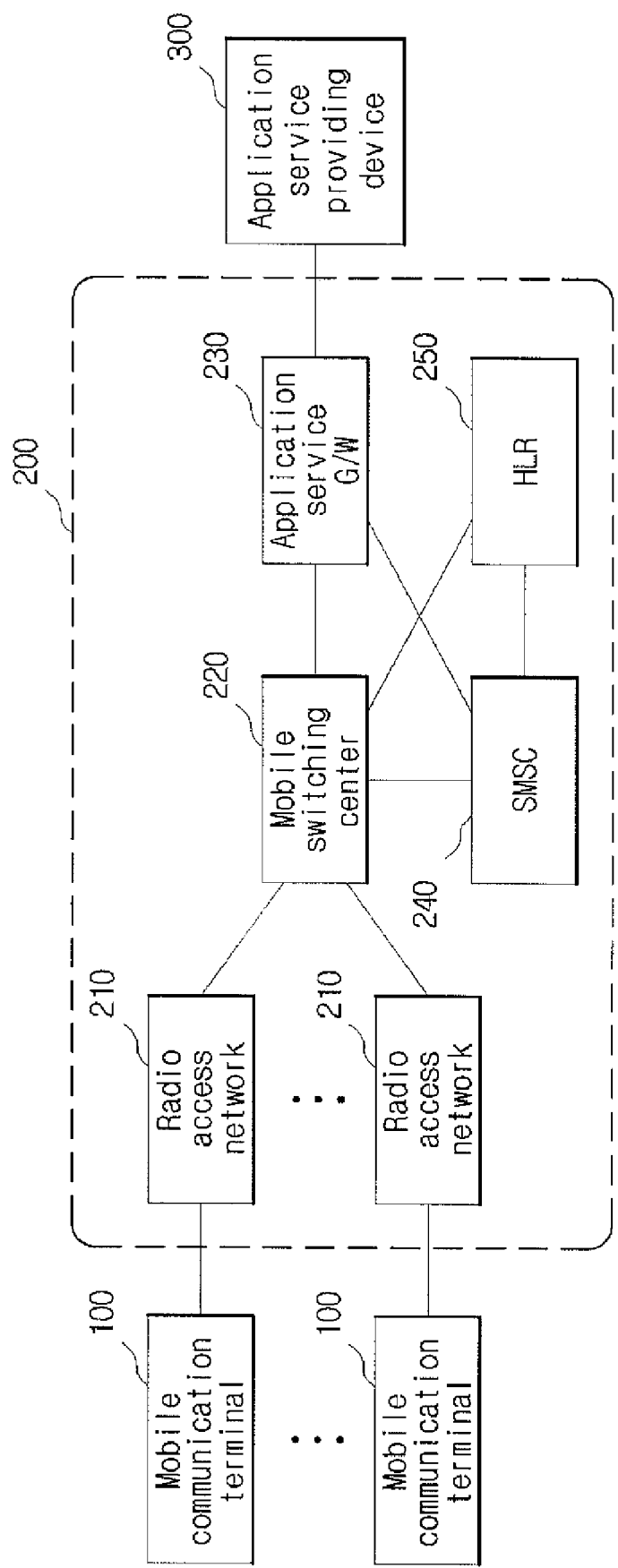
FIG. 1 illustrates an application service providing system in accordance with one embodiment of the present invention.

Generally, the WCDMA system can support various video application services such as a multilateral video conference service, performing a conference between a plurality of users through a video telephony, a voice conference service, performing a conference through a voice telephony, and a monitoring service, monitoring a specific place through a monitoring terminal mounted on a place selected by a user. However, the necessary functions for these application services are varied per each service and per operating status of the pertinent service.

For example, a moderator, who requests the video conference service, needs to be able to select participants for the video conference and moderate the video conference in progress (e.g. controlling of the opportunity of speaking). In addition, the video conference service in progress requests some additional functions such as a function (e.g. a secret communication), selecting a specific participant among the participants and the moderator to talk to the selected participant during the video conference and a chatting function exchanging a text message with each other during the video conference. Unlike the aforementioned video conference service, the monitoring service needs a function for the monitoring operation, for example, the screen controlling operation such as the movement in upper, lower, left and light directions and the expanding/contracting. However, when conventionally using the application service, the user had to input a command of user's desired function directly.

For example, in the case of selecting a participant in the video conference service or the voice conference service, a mobile identification number (MIN) of the participants bad to be directly inputted according to a predetermined format such as "*01#01000011234#01000021234# . . . #01000031234." In other words, in case that a participant selects another participant, the participant is unable to use call history or phone list, stored in the terminal, but had to inconveniently input the participant's number of 11 figures one by one, to manipulate functions for using the service.

Meanwhile, the conventional mobile communication terminal such as the WCDMA terminal and the CDMA terminal can allow the user to simply control the mobile communication terminal through a menu button. The aforementioned menu, corresponding to an operating mode of the terminal, for example, a non-busy line mode or a busy line mode, is unvaried.

The aforesaid WCDMA network, for example, basically provides a video call on a circuit service (CS) basis. Accordingly, in the case of using a video application service by use of the conventional mobile communication terminal, the mobile communication terminal is unable to recognize the video application service differently from the video call, and recognizes the video service as the busy line mode in spite of using the video service. This causes to identically provide the unvaried menu (e.g. transmission sound exclusion and user phone number transmission) by the terminal's standard for the busy line mode without the recognition per service.

FIG. 1 illustrates an application service providing system in accordance with one embodiment of the present invention.

Referring to FIG. 1, an application service system includes a mobile communication terminal 100, a mobile communication system 200 and an application service providing device 300.

The mobile communication terminal 100, which has a function receiving and processing a video, includes all user terminals capable of using the video application service while moving, such as a portable phone and PDA, for example, on a WCDMA basis.

The mobile communication system 200, which supports the communication of a wireless signal with the mobile communication terminal 100, performs the coupling and the transferring of data related to the application service, between the mobile communication terminal 100 and the application service providing device 300.

The mobile communication system 200 can be divided into various types per operator or per standard. One embodiment of the present invention relates to a mobile communication system of a WCDMA method, capable of stably providing the video application service by guaranteeing both the stable transmission of huge amounts of data and the mobility.

In the embodiment of the present invention of FIG. 1, the mobile communication system of the WCDMA method is taken as an example. Referring to FIG. 1, the mobile communication system 200 includes radio access networks (RAN) 210, performing the coupling with the mobile communication terminal 100 to transfer a video call, data related to a video application service, and a voice call, data related to a voice application service in a form of a wireless signal, a mobile switching canter (MSC) 220, forming an coupling point for a user traffic between the RANs 210 and between other MSCs to provide a line exchanging service to a subscriber, a short message service center (SMSC) 240, transferring control information for providing the voice application service, a home location register (HLR) 250, recognizing location information of the mobile communication terminal, and an application service gateway (G/W) 230, exchanging information through protocol conversion between application service providing devices 300.

The MSC 220 allows a mobile phone service to be provided every time by additionally tracking the location of a mobile phone subscriber. Even if the location is changed, the MSC 220 has a hand-off function maintaining the communication service.

The application service providing device 300 provides various video application services and voice application services on a video basis to the mobile communication subscriber. For example, the video application service can include a video conference service, capable of multilaterally seeing and talking to each other at the same time, and a monitoring service, photographing a predetermined specific place and providing corresponding pictures to the user in real time, but not limited thereto. The video application service can include any video based service. The voice application service can include a voice conference service capable of multilateral talking at the same time and an ARS service for the blind, for example. The application service providing device 300 can include an access server, connected to the mobile communication system 200 and processing the access of the mobile communication subscriber, a media server, providing a video conference service or a voice conference service, and a monitoring server, providing a monitoring service, for example.

Figure 2:
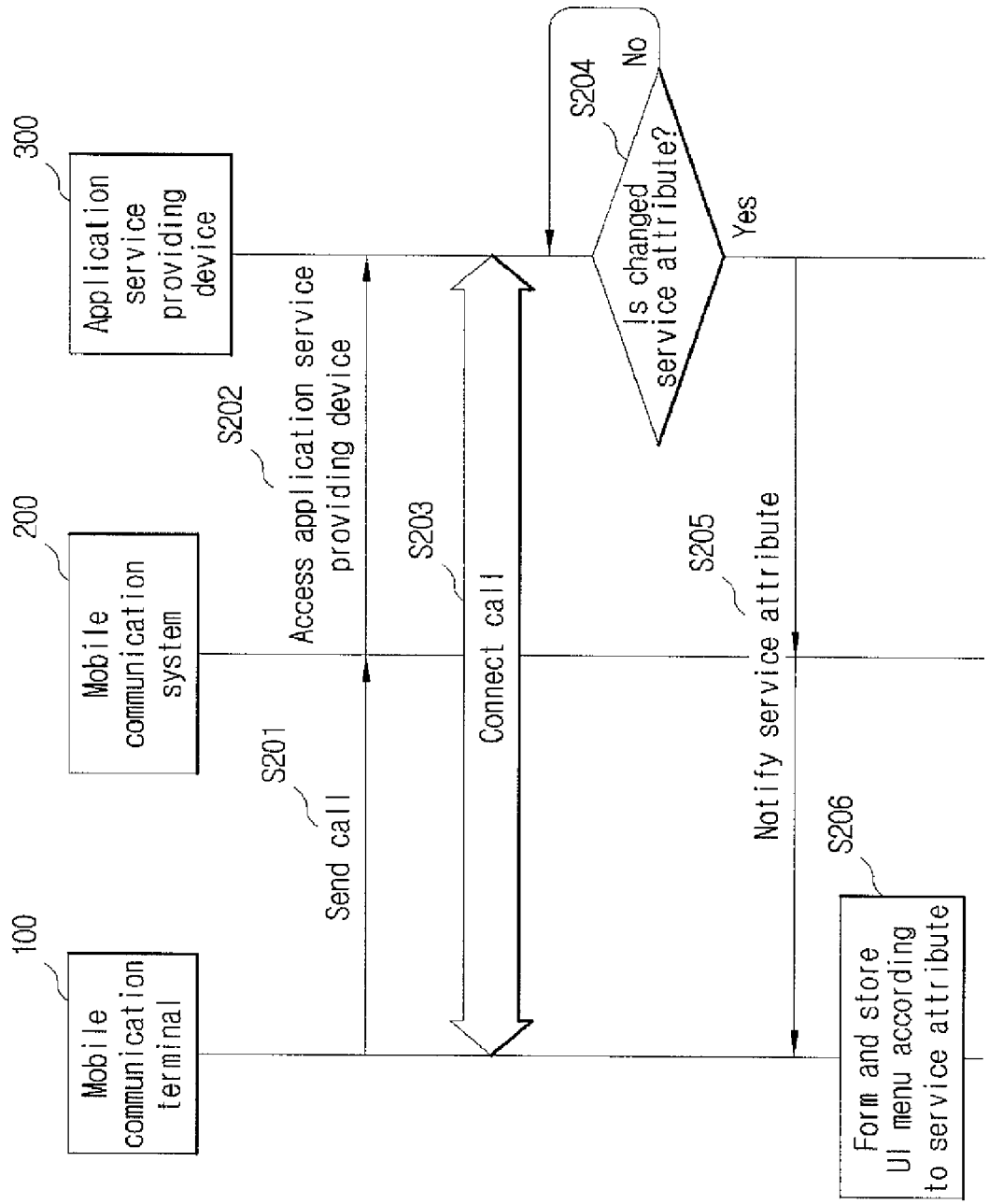
FIG. 2 is a flow chart illustrating a method for controlling a user interface menu for providing an application service in accordance with a first embodiment of the present invention.

FIG. 2 is a basic flow chart illustrating a method for controlling a user interface menu for providing an application service in accordance with a first embodiment of the present invention.

Hereinafter, the basic flow of the method for controlling the user interface menu in accordance with the first embodiment of the present invention will be described with reference to the aforesaid configuration of FIG. 1.

Typically, if a user attempts to use an application service, the user manipulates the mobile communication terminal 100 to request the application service. Accordingly, the call requesting the application service is sent from the mobile communication terminal 100 at a step represented by S201. The sent call, which requests the application service, can be recognized as a representative number allotted for the application service, for example.

If the mobile communication system 200 receives a request of connecting to the call sent from the mobile communication terminal 100, the mobile communication system 200 checks that the received request is a call requesting the application service by referring to a destination number of the received call. Accordingly, the mobile communication system 200 accesses the application service providing device 300 to transmit a request message for session setting in a step represented by S202.

Then, the mobile communication system 200 performs the negotiating process according to a standard between the mobile communication system 200 and the application service providing device 300 and another standard between the mobile communication system 200 and the mobile communication terminal 100. Accordingly, the call is connected between the mobile communication terminal 100 requesting the application service and the application service providing device 300 providing the application service in a step represented by S203.

If the call is connected, the corresponding application service is provided from the application service providing device 300 to the pertinent mobile communication terminal 100 through the connected call. At this time, the application service providing device 300 checks whether the attribute of the application service is provided to the mobile communication terminal 100 is changed in a step represented by S204. Whenever the attribute of the application service is changed, the changed attribute is notified to the mobile communication terminal 100 in a step represented by S205.

The mobile communication terminal 100, which has notified the changed service attribute, changes a menu of the user interface to be suitable for the notified service attribute in a step represented by S206. For this, the mobile communication terminal 100 pre-stores various user interface menu data per service attribute in the memory. Also, the mobile communication terminal 100 searches the proper menu data for the received service attribute to change the user interface menu according to the searched the menu data, to thereby provide the menu suitable for the service attribute to the user. This leads to the promotion of the convenience for the user to use the application service. In the above description, the user interface menu data, to be stored in the terminal per service attribute, includes a menu title, to be displayed on a screen of the mobile communication terminal, and a command or function information to be performed per each menu title in case that the menu key is selected.

The operation and efficiency of the method for controlling the menu for providing the application service in accordance with one embodiment of the present invention can be more easily understood through the embodiment to be described below.

Figure 3:
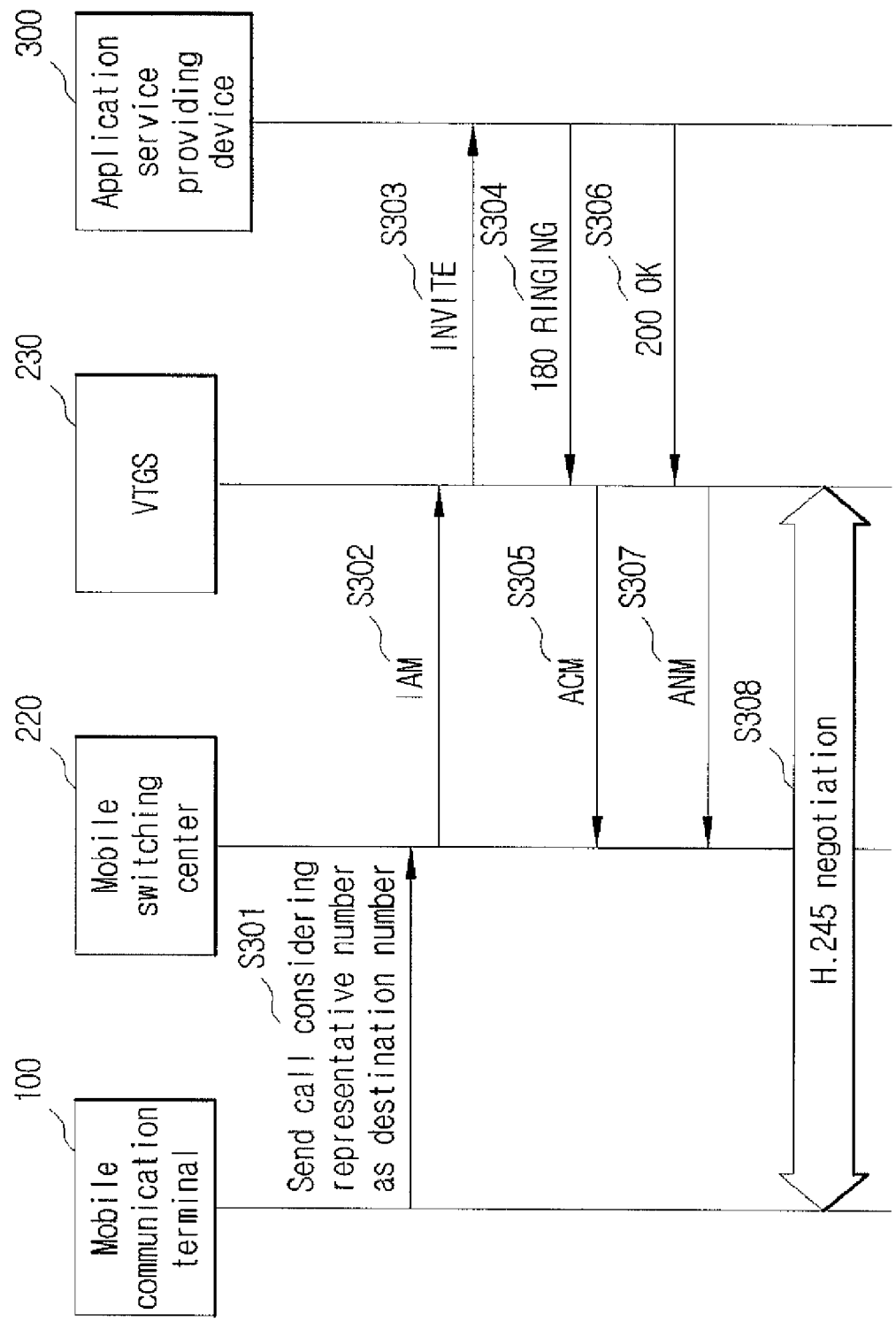
FIG. 3 and FIG. 4 are flow charts illustrating a video conference service operation in accordance with a first embodiment of the present invention.
Figure 4:
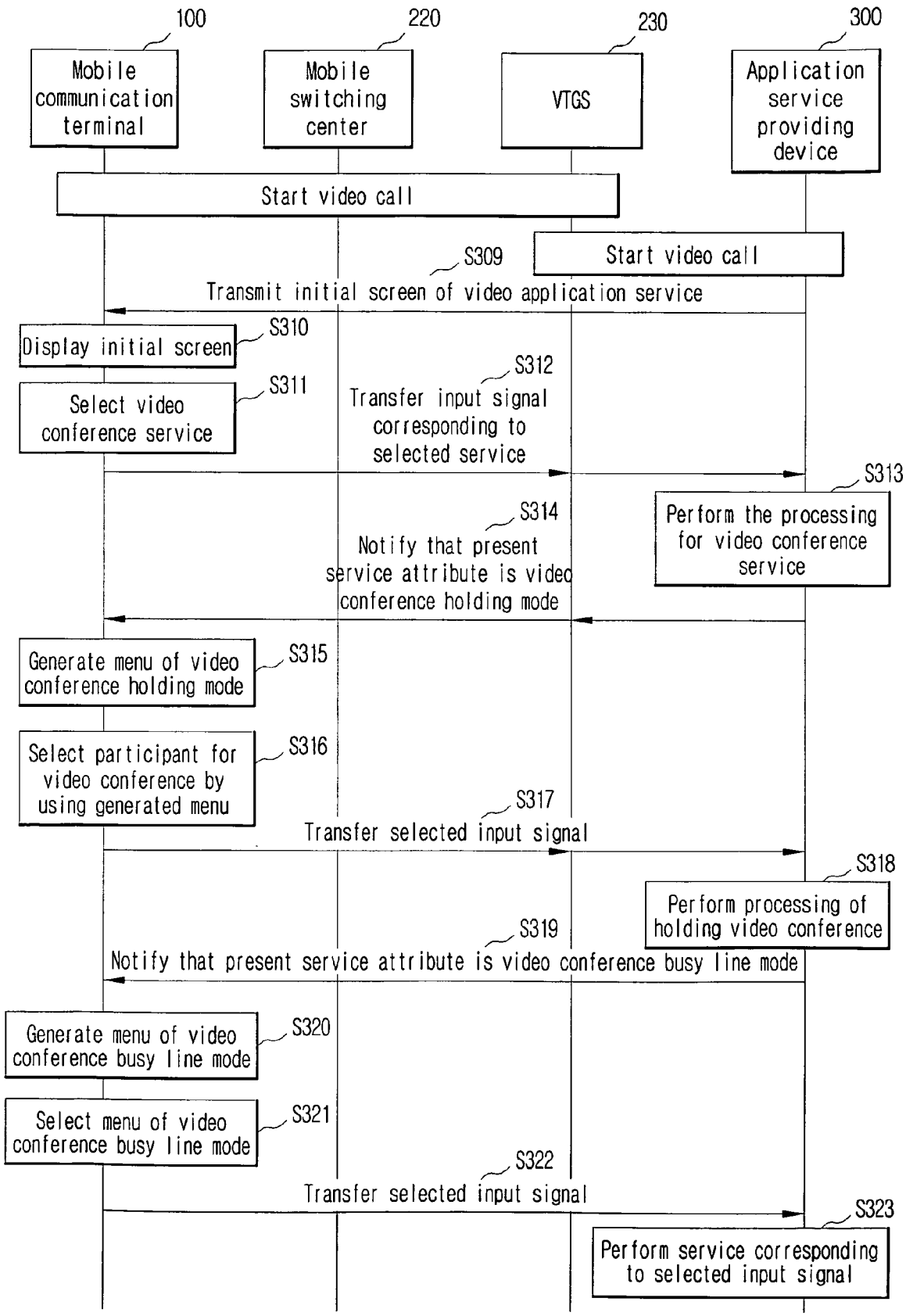

FIG. 3 and FIG. 4 are flow charts illustrating a video conference service operation in accordance with a first embodiment of the present invention.

FIG. 3 and FIG. 4 illustrate the detailed process of a video application service, particularly, the detailed process of a video conference service of the video application service.

Referring to FIG. 3 and FIG. 4, in case that a user needs to receive a video conference service, if the user requests the video application service, a video call considering a representative number, set corresponding to the video application service, as a destination number is transferred to the MSC 220 of the mobile communication system 200 in a step represented by S301.

The MSC 220 checks the receiver in the sent call and recognizes the provided representative number for the video application service. According to the recognized representative number, the MSC 220 transmits an initial address message (IAM) of the ISUP standard to a video telephony gateway system (VTGS) 230, which is a video application service gateway connected to the pertinent application service providing device 300, to request the call setting in a step represented by S302.

The VTGS 230 converts the received IAM into an INVITE message of the session initiation protocol (SIP) standard and transmits the INVITE message to the pertinent application service providing device 300, more specifically, an access server to transfer the video application service request of the mobile communication terminal 100 in a step represented by S303.

Once the INVITE message is received, the access server of the application service providing device 300 processes the message according to the predetermined internal standard and transfers a 180 RINGING message to the VTGS 230. Also, the access server determines whether the service of the pertinent mobile communication terminal 100 can be used. In case it is determined that the service can be provided, a "200 OK" response message is transmitted in a step represented by S306. Accordingly, the session for providing the service to the mobile communication terminal 100 is set between the VTGS 230 and the video service providing device 300.

Beside that, by converting the received 180 RINGING message into an address complete message (ACM) of ISUP to transfer the ACM to the MSC 220 in a step represented by S305 and the 200 OK response message into an answer message (ANM) to transfer the ANM to the MSC 220 in a step represented by S307, the VTGS 230 informs the MSC 220, connected to the transmitter (i.e. the mobile communication terminal 100), that the receiver (i.e. the application service providing device 300) has received all address information necessary for the call setting and has responded to the sent video call.

Then, H.245 negotiation between the mobile communication terminal 100 and the VTGS 230 is performed. Once the negotiation is completed, the video call is started in a step represented by S308.

By the aforementioned processes, a communication channel from the mobile communication terminal 100 to the application service providing device 300 is connected. The application service providing device 300 transmits an initial screen of the video application service to the mobile communication terminal 100, which has sent the video call, through the connected channel in a step represented by S309.

Figure 9:
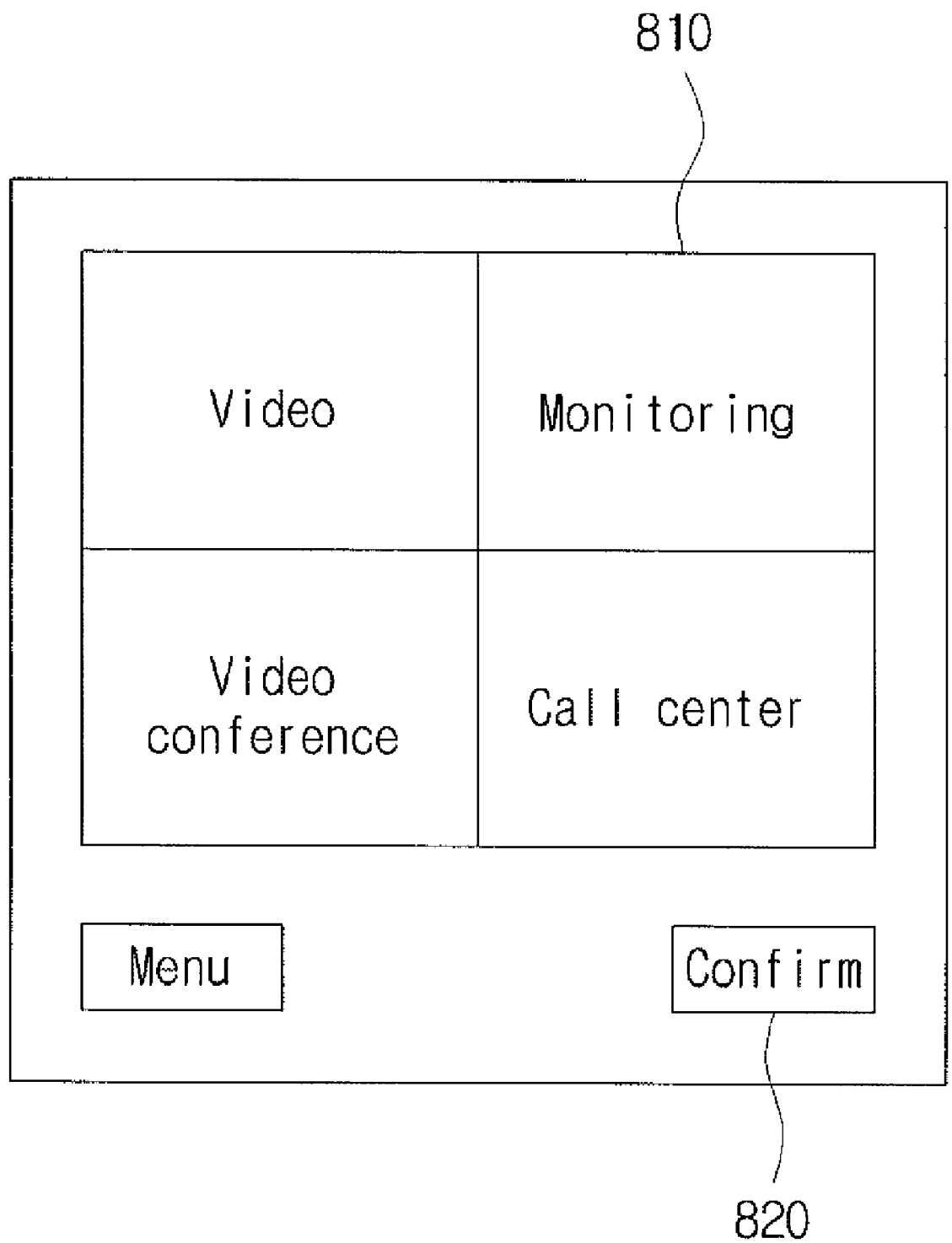
FIG. 9 is an example of a user interface screen displayed on a mobile communication terminal in the initial operation of a video application service.

Accordingly, the mobile communication terminal 100 displays the initial screen to a user through a user interface in a step represented by S310. At this time, the provided attribute of the service has not yet notified to the mobile communication terminal 100. Thus, the user interface menu of the mobile communication terminal 100 is formed as a default value (e.g. a menu predetermined to be provided according to the terminal's standard when the line is busy) according to the terminal's standard. FIG. 9 is an example of the initial screen of the video application service displayed on a mobile communication terminal 100. The service type (e.g. video, monitoring, video conference, and call center), provided through the initial screen 810, is displayed to the user, and the user selects desired one of the displayed types.

The user selects the desired service, for example, the video conference service in a step represented by S311. Then, if a confirming button 820 is pushed, an input signal corresponding to the selected service is transmitted from the mobile communication service 100 to the application service providing device 300 in a step represented by S312. The application service providing device 300 checks the received input signal to recognize that the user requests the video conference service and performs the process according to the internal standard to allow the corresponding service to be provided in a step represented by S313.

The application service providing device 300 checks the attribute of the service to be provided to the user and transmits to the mobile communication terminal 100 a service attribute notifying message notifying that the present service attribute is the video conference holding mode in a step represented by S314.

The mobile communication terminal 100, which has received the service attribute notifying message, forms and provides the user interface having a menu appropriate for the video conference holding mode in a step represented by S315. As described above, the mobile communication terminal 100 pre-stores menu information that is respectively set per service attribute. If the service attribute is notified as described above, information corresponding to the pertinent service attribute is searched and the user interface menu is changed. At this time, in case that there is no menu information which is set to be suitable for the notified service attribute, the default value (i.e. the menu according to the terminal standard) is displayed.

FIG. 10(a) is an example of a user interface screen in the video conference holding service mode, and (b) is an example of a menu structure shown in the video conference holding service mode. The moderator, holding the video conference, must select the participants for the video conference and inform the application service providing device 300 of information related to the participants (in more detail, the MIN of the participants). Accordingly, as shown in FIG. 10(a), the user interface screen of the video conference holding service mode displays a screen 910 selecting and inputting the video conference participants. As shown in FIG. 10(b), the menu provides a 'call history viewing' operation viewing previous call history stored in the mobile communication terminal 100 or a 'phone number list searching' operation searching a phone number stored in the mobile communication terminal 100, for easy selection of the participants.

In accordance with the embodiment of the present invention, the mobile communication subscriber, who moderates the video conference, can simply select the participants by remembering all mobile identification numbers (MIN) of the participants' mobile communication terminals and selecting a menu item corresponding to the '1' to view the call history and to select the pertinent participant in the viewed call history or by selecting a menu item corresponding to the '2' to view the registered phone list and to select the pertinent participant without direct inputting.

As described above, the participant is selected by using the menu corresponding to the service attribute of the video conference holding mode. Then, if a confirming button 930 is pushed in a step represented by S316, participant information is transferred to the application service providing device 300 in a previously defined form in a step represented by S317. For example, the form of transferring the participant information refers to "01#a first participant's MIN#a second participant's MIN . . . #$n^{th}$ participant's MIN." The user inputs all MINs of the first participant through the $n^{th}$ participant. Then, if the confirming button is pushed, the mobile communication terminal 100 generates an input signal corresponding to the form "*01#a first participant's MIN#a second participant's MIN . . . #$n^{th}$ participant's MIN" and transmits the generated input signal to the application service providing device 300.

If a DTMF signal in the form "*01#a first participant's MIN#a second participant's MIN . . . #$n^{th}$ participant's MIN" is received, the application service providing device 300, more particularly, the access server performs the processing of holding the video conference, for example, recognizes that the signal is to transfer the participant information and extracts the MIN behind '#' to transfer a request message of participating the video conference to each of the pertinent participants' mobile communication terminals through linking with a media server and to inform the moderator's mobile communication terminal 100 of the corresponding response results of the respective mobile communication terminals in a step represented by S318. Also, the access server transmits the service attribute notifying message indicating the video conference busy line mode to the mobile communication terminal of the moderator who moderates the video conference in a step represented by S319.

For the mobile communication terminals (not shown) of the participants who accept the invitation to the video conference as well as the moderator's screen, the operations after the step represented by S319, which is not shown in FIG. 4, is performed in the same form.

As described above, the mobile communication terminal 100, which has received the service attribute notifying message notifying that the present service attribute is the video conference busy line mode, changes the user interface menu appropriate for the notified service attribute (i.e. the video conference busy line mode) in a step represented by S320.

Figure 11:
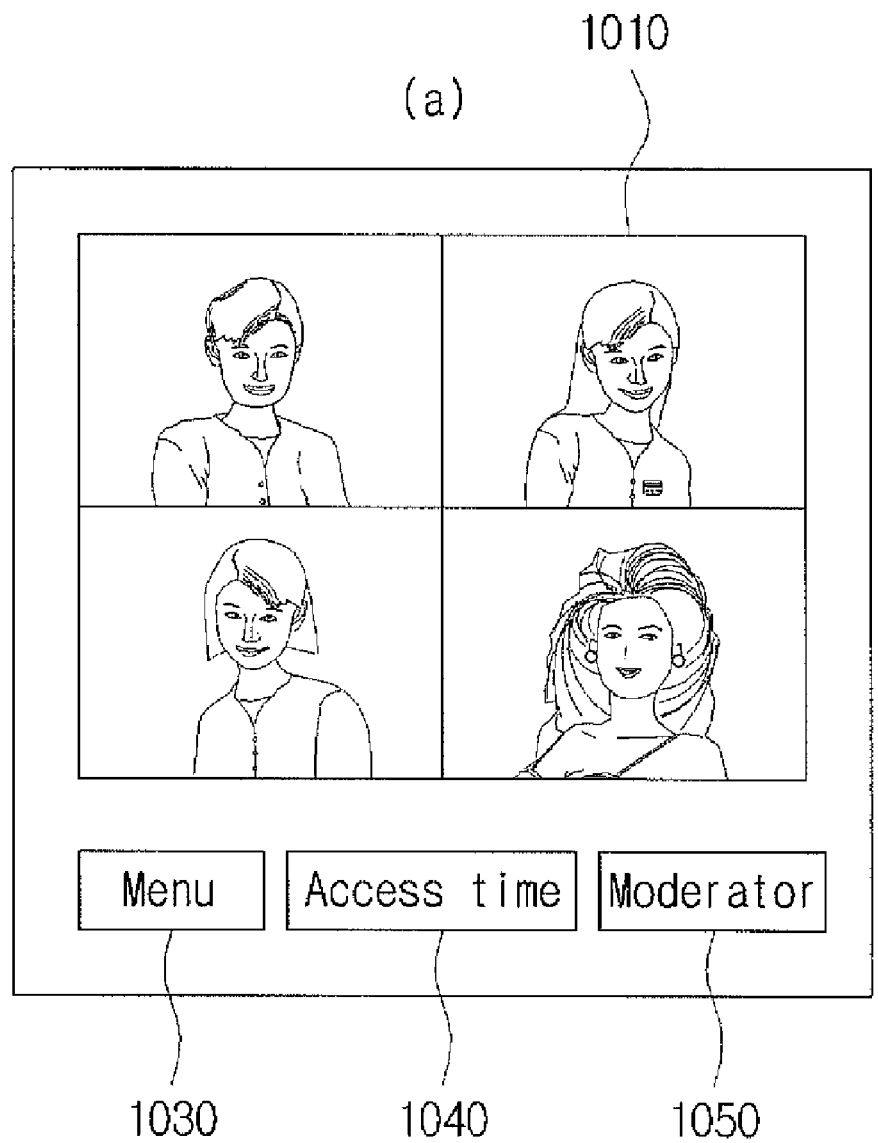
FIG. 11(a) is an example of a user interface screen in a video conference busy call mode, and (b) is an example of a menu structure shown in the video conference busy call mode, in accordance with one embodiment of the present invention.

FIG. 11(a) illustrates the user interface screen of the mobile communication terminal 100 in case that the video conference is in progress, and FIG. 11(b) illustrates a menu structure shown when a menu 1030 displayed on the user interface screen of FIG. 11(a). In case that the line is busy for the video conference, one of the video conference moderator and all participants and the other see their face images and communicate with each other by receiving and displaying on a screen 1010 the face images.

At this time, it becomes necessary for the participant to use the functions such as a secret communication with a specific participant and a chatting instead of the function making it easy to select the participant. For the moderator, it also becomes necessary to use a speech restricting function as a controlling function for the progress of the video conference. Accordingly, in accordance with one embodiment of the present invention, as described above, the user interface menu 1030 can include at least one function of the 'secret communication' with a specific participant except for other participants, the 'Speech restriction' restricting the voice of a specific participant to be transferred to the other participants and the 'chatting' exchanging a text massage with a specific participant, illustrated in FIG. 11(b), in the case of the video conference busy line mode, by changing the menu according to the service attribute notification.

Thus, the user can simply select a specific item in the menu in a step represented by S321, to thereby be able to inform the application service providing device 300 of the desired function in a step represented by S322. This is realized in a form that an input signal corresponding to the selected menu item is transmitted to the application service providing device 300. The application service providing device 300 performs the service corresponding to the input signal and provides the service to the user in a step represented by S323.

Figure 5:
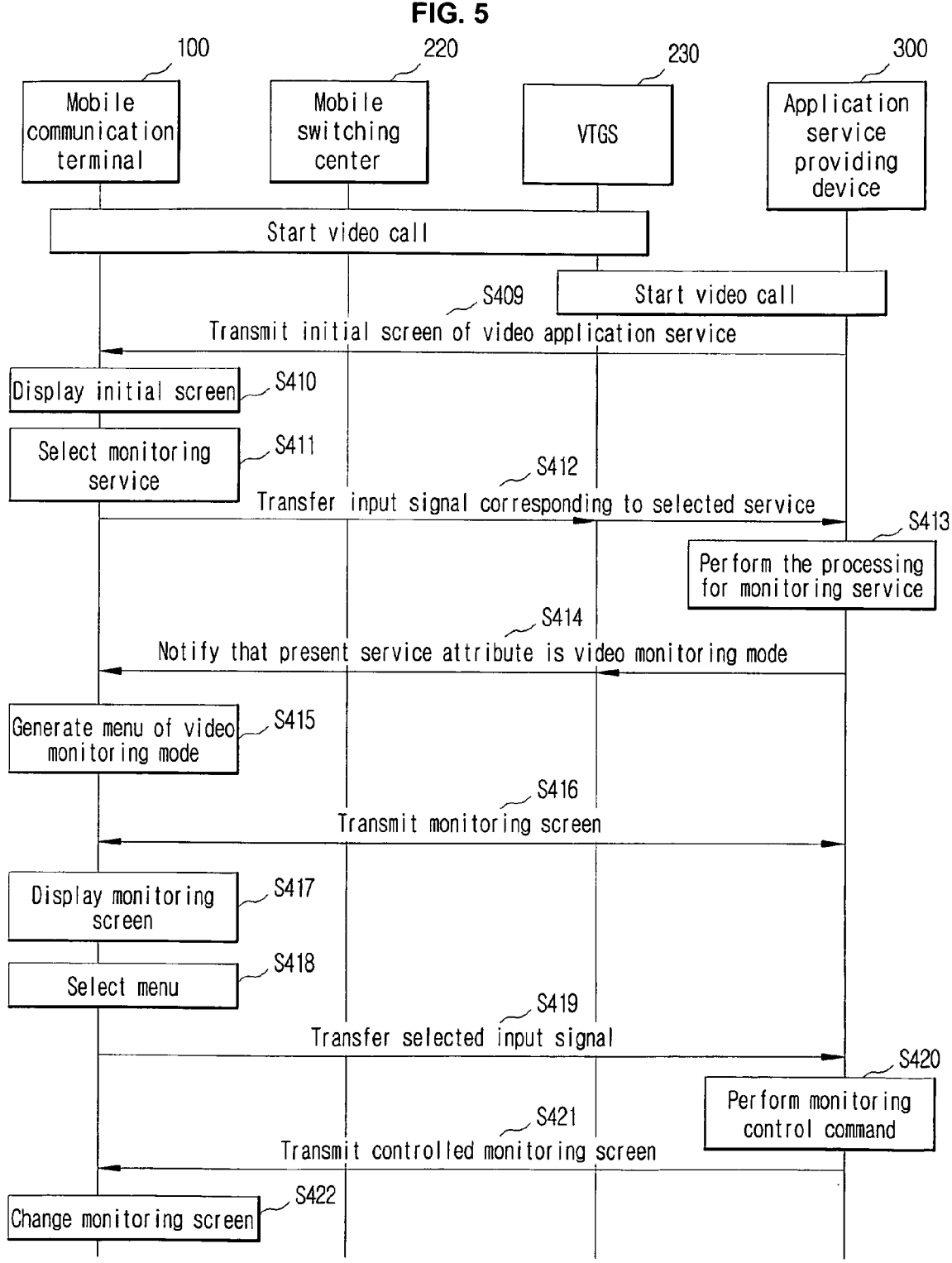
FIG. 5 is a flow chart illustrating a video monitoring service operation in accordance with a first embodiment of the present invention.

FIG. 5 is a flow chart illustrating a video monitoring service operation in accordance with a first embodiment of the present invention.

FIG. 5 is a flow chart illustrating a service process when providing a monitoring service, which is another embodiment of the present invention.

Since the video call connecting operation of FIG. 5 is identical to that of the steps represented by S301 through S308 of FIG. 3(*a*), the pertinent description will be omitted to avoid the duplication.

The monitoring service is provided in the case of selecting the monitoring service in the initial screen, transmitted to the mobile communication terminal 100 by the aforesaid steps. If a user selects the monitoring service in the initial screen of FIG. 9 for example, an input signal of a selecting key set corresponding to the pertinent monitoring service is transmitted from the mobile communication terminal 100 to the application service providing device 300. The application service providing device 300, more particularly, the access server receives the input signal and recognizes that the monitoring service is requested. Also, the access server is linked with the pertinent monitoring server and performs the process for providing the monitoring service in accordance with the internal standard in a step represented by S413. For example, the step represented by S413 can include the operation, accessing a monitoring terminal set by the user and gathering a monitoring video signal from the monitoring terminal.

At the same time, the application service providing device 300 transmits a service attribute notifying message, notifying that the service attribute is the video monitoring mode, to the mobile communication terminal that requests the monitoring service in a step represented by S414.

The mobile communication terminal 100, which has received the service attribute notifying message, changes the user interface menu to the notified service attribute, that is, the menu corresponding to the video monitoring mode in a step represented by S415.

Beside that, the application service providing device 300, which has performed the process for providing the monitoring service, transmits the monitoring video, gathered from the designated monitoring terminal, to the mobile communication terminal 100. The mobile communication terminal 100 displays the received monitoring video through a user interface screen in a step represented by S416.

Figure 12:
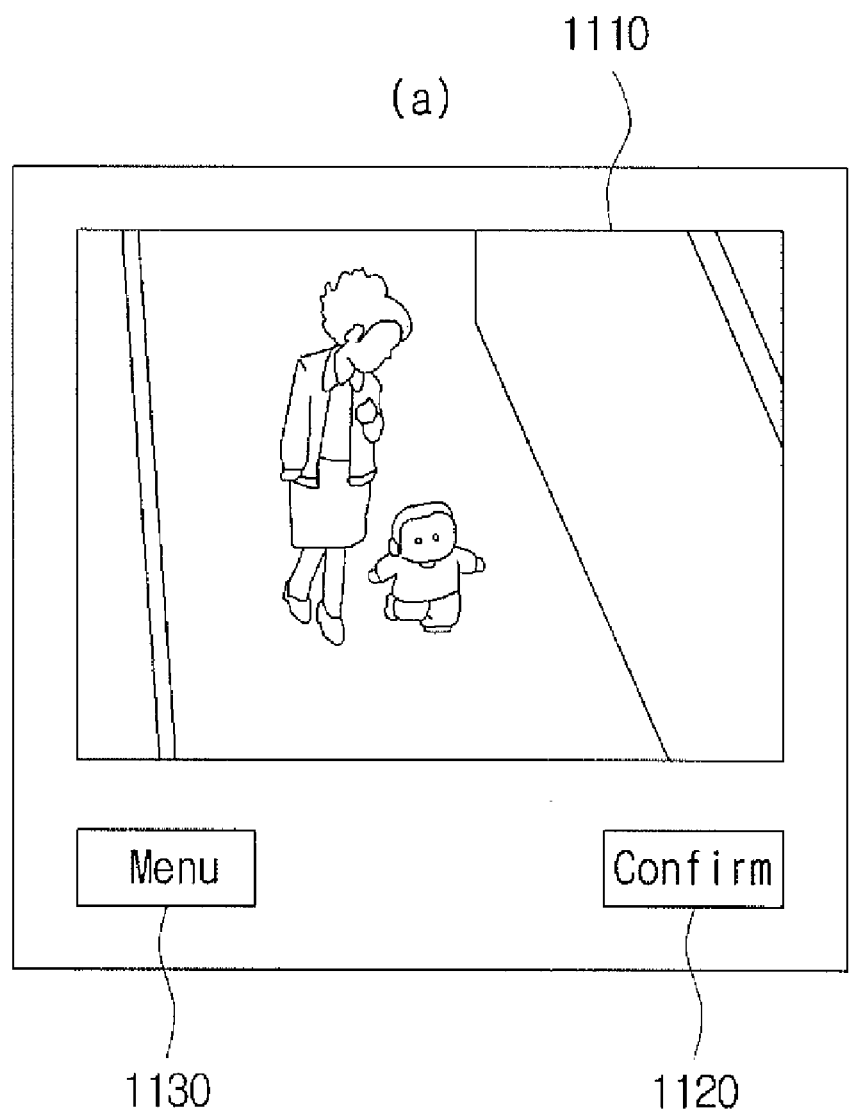
FIG. 12(a) is an example of a user interface screen in a video monitoring mode, and (b) is an example of a menu structure shown in the video monitoring mode in accordance with one embodiment of the present invention.

FIG. 12(*a*) is an example of the user interface screen provided from the mobile communication for the monitoring service and (*b*) is an example of a menu structure shown in the user interface screen for the monitoring service. As described therein, in the case of receiving the monitoring service, the user interface includes a monitoring screen 1110 displaying the video provided from the application service providing device 300, a user menu 1130 for the monitoring service and a confirming button 1120 transmitting user selection. The user menu 1130 for the monitoring service, which is the control menu for the monitoring terminal, can include an expanding function, a contracting function, a right moving function and a left function, which control the size and location of the monitoring screen as illustrated in FIG. 12(*b*).

The user can simply transmit his or her request to the application service providing device 300 by selecting the user menu 1130 for the monitoring service. In more detail, if the user selects a special one of the items of the user menu 1030 and pushes the confirming button 1120, an input signal, defined for the menu selected from the mobile communication terminal 100, is transmitted to the application service providing device 300 in a step represented by S419. Accordingly, the application service providing device 300 controls the monitoring terminal according to the request in a step represented by S420. As such, the controlled monitoring screen is transmitted to the mobile communication terminal 100 in a step represented by S 421. The mobile communication terminal 100 changes and displays the controlled monitoring video, provided by the aforementioned steps, trough the monitoring screen 1110 in a step represented by S422.

As described above, the user can get the desired monitoring screen by using only simple key manipulation without inputting of the complicated command and by controlling the monitoring terminal.

Figure 6:
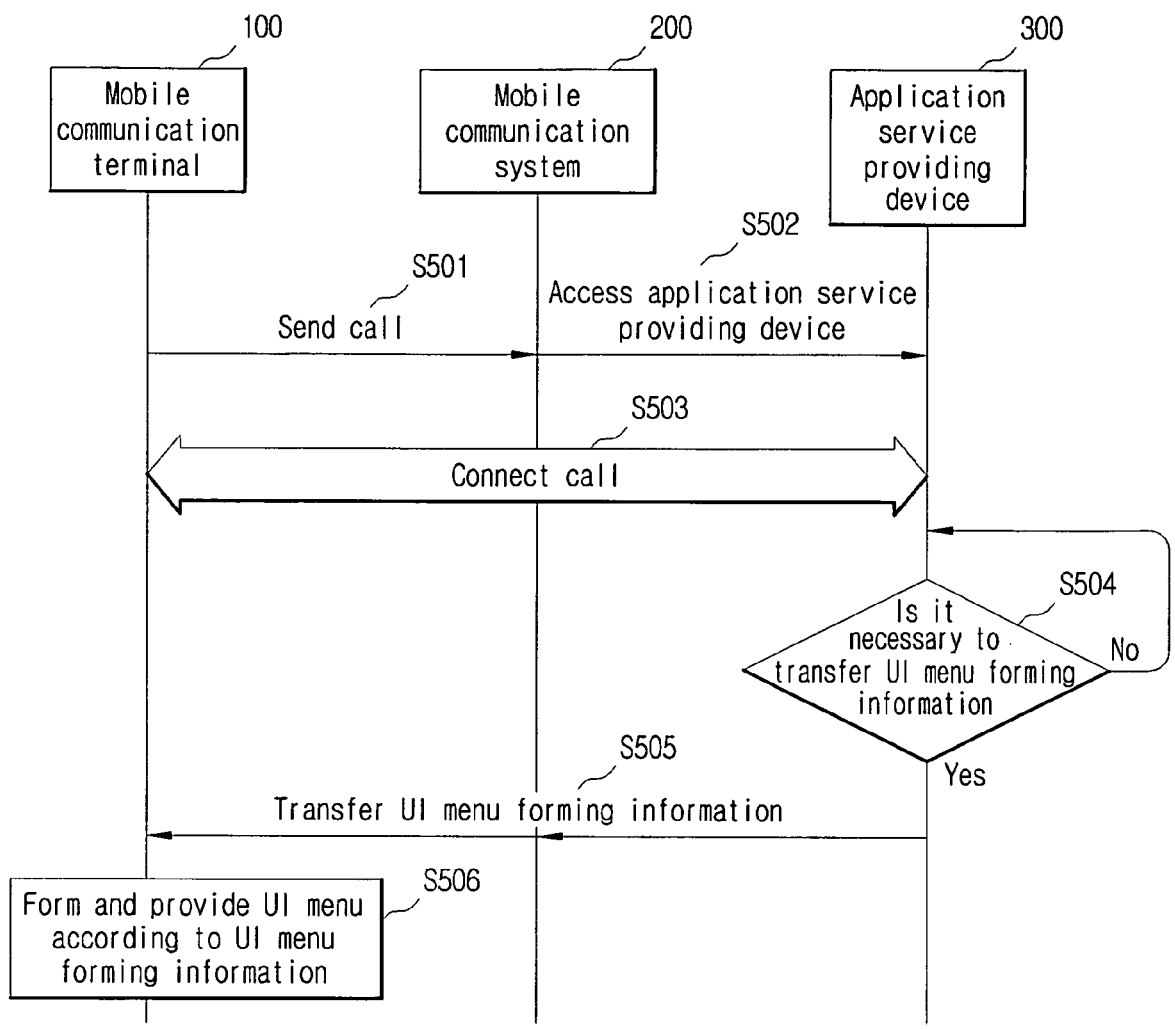
FIG. 6 is a flow chart illustrating a method for controlling a user interface menu for providing an application service in accordance with a second embodiment of the present invention.

FIG. 6 is a flow chart illustrating a method for controlling a user interface menu for providing an application service in accordance with a second embodiment of the present invention.

If a user attempts an application service, the user manipulates the mobile communication terminal 100 to request the application service. Accordingly, a call requesting the application service is sent from the mobile communication terminal 100 in a step represented by S501.

If the mobile communication system 200 receives a call connection request sent from the mobile communication terminal 100, the mobile communication system 200 checks that the received request is an application service requesting call by referring to a destination number of the received call. Accordingly, the mobile communication system 200 accesses the application service providing device 300 corresponding to the destination to transmit a request message for session setting in a step represented by S502.

Then, the mobile communication system 200 performs the negotiating process according to a standard between the mobile communication system 200 and the application service providing device 300 and another standard between the mobile communication system 200 and the mobile communication terminal 100. Accordingly, the call is connected between the mobile communication terminal requesting the application service and the application service providing device 300 providing the application service in a step represented by S503.

If the call is connected, the corresponding application service is provided from the application service providing device 300 to the pertinent mobile communication terminal 100 through the connected call. At this time, the application service providing device 300 checks the application service provided to the mobile communication terminal 100 and determines whether it is necessary to transfer user interface menu forming information in a step represented by S504. If it is determined that it is necessary to transfer user interface menu forming information, the application service providing device 300 notifies the mobile communication terminal 100 of the user interface menu configuration information corresponding to the pertinent application service attribute in a step represented by S505. Here, the user interface menu forming information, which is the menu forming information formed differently according to the service attribute of each application service, can be stored in a storing unit of the application service providing device 300 or in a database linked with the application service providing device 300.

The mobile communication terminal 100, which has been notified the user interface menu forming information, changes a menu of a user interface to correspond to the notified user interface menu forming information in a step represented by S506. Here, in the case of manipulating a menu key, the user interface menu can be displayed on a display screen or on a pop-up window in a part of the display screen of the mobile communication terminal regardless of the key manipulation.

The user interface menu forming information, received by the mobile communication terminal 100, includes a menu title to be displayed on the mobile communication terminal screen and menu component data, being in charge of a function to be performed per each menu title in the case of selecting the menu key corresponding to the pertinent service.

The mobile communication terminal 100 pre-stores various menu component data in a memory and changes the user interface menu by varying the combination of the component data suitable for the received user interface menu forming information, to thereby providing the menu appropriate for the service attribute. This can lead to the promotion of convenience for the user who uses the application service.

The mobile communication terminal 100 stores various menu component data in the memory in advance. Although the application service is changed or a new application service is developed, the mobile communication terminal 100 can form the changed or newly developed application service by receiving the user interface menu forming information and combining the menu component data. In other words, the mobile communication terminal 100 receives the user interface menu forming information and forms the corresponding user interface menu. Accordingly, even though the application service is changed or expanded, a menu program of the mobile communication terminal 100 is not requested to be upgraded.

The operation and efficiency of the method for controlling the menu for providing the application service in accordance with one embodiment of the present invention can be more easily understood through the embodiment to be described below.

Figure 7:
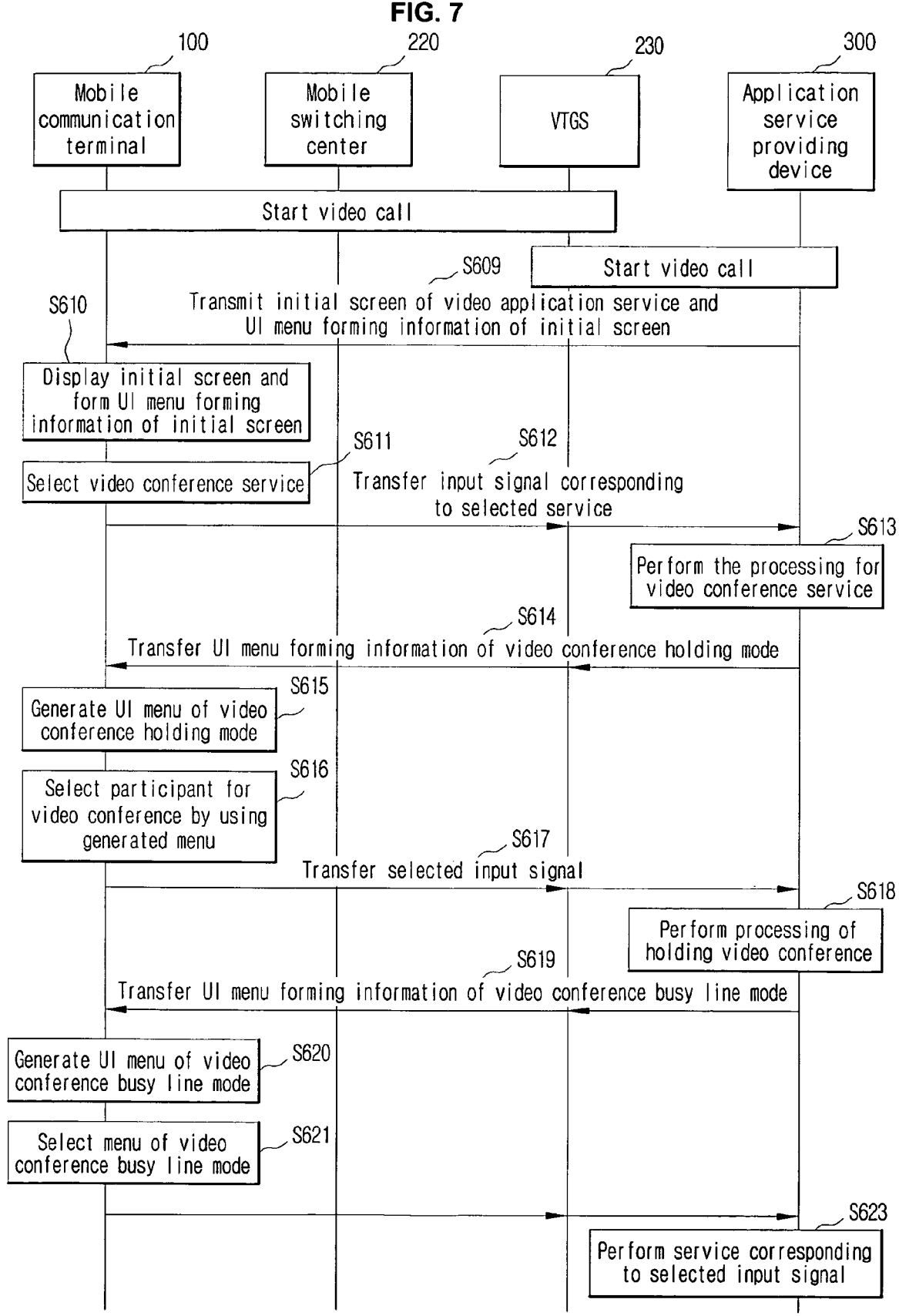
FIG. 7 is a flow chart illustrating a video conference service operation in accordance with a second embodiment of the present invention.

FIG. 7 is a flow chart illustrating a video conference service operation in accordance with a second embodiment of the present invention.

Since the video call connecting operation of FIG. 7 is identical to that of the steps represented by S301 through S308 of FIG. 3, the pertinent description will be omitted to avoid the duplication.

A communication channel from the mobile communication terminal 100 to the application service providing device 300 is connected. The application service providing device 300 transmits an initial screen of the video application service to the mobile communication terminal 100, which has sent the video call, through the connected channel in a step represented by S609. At this time, the application service providing device 300 transfers to the mobile communication terminal 100 user interface menu forming information corresponding to the initial screen of the video application service.

The mobile communication terminal 100 displays the received initial screen to a user through a user interface in a step represented by S610. Also, the mobile communication terminal 100 can combine menu component data, stored in the mobile communication terminal 100, by using the received use interface menu forming information to form a corresponding user interface menu.

FIG. 9 is an example of the initial screen of the video application service displayed on a mobile communication terminal 100. The service type (e.g. video, monitoring, video conference, and call center), provided through the initial screen 810, is displayed to the user, and the user selects desired one of the displayed types.

The user selects the desired service, for example, the video conference service in a step represented by S611. Then, if a confirming button 820 is pushed, an input signal corresponding to the selected service is transmitted from the mobile communication service 100 to the application service providing device 300 in a step represented by S612.

The application service providing device 300 receives the received input signal to check that the user requests the video conference service and performs the process according to the internal standard to allow the corresponding service to be provided in a step represented by S613.

The application service providing device 300 checks the attribute of the service to be provided to the user and transmits to the mobile communication terminal 100 user interface menu forming information corresponding to a video conference holding mode in case that the present service attribute is the video conference holding mode, in a step represented by S614.

The mobile communication terminal 100, which has received the user interface menu forming information, forms and provides the user interface having a menu appropriate for the video conference holding mode in a step represented by S615.

As described above, the mobile communication terminal 100 stores the menu component data forming the menu in advance. If the user interface menu forming information is received, the mobile communication terminal 100 searches and combines the pertinent menu component data to form the user interface menu. If the user interface menu forming information is not transferred, the mobile communication terminal 100 can display the default value (i.e. the menu according to the terminal standard).

FIG. 10(a) is an example of a user interface screen in the video conference holding service mode, and (b) is an example of a menu structure shown in the video conference holding service mode. The moderator, holding the video conference, must select the participants for the conference and inform the application service providing device 300 of information related to the participants (in more detail, the MIN of the participants).

Figure 10:
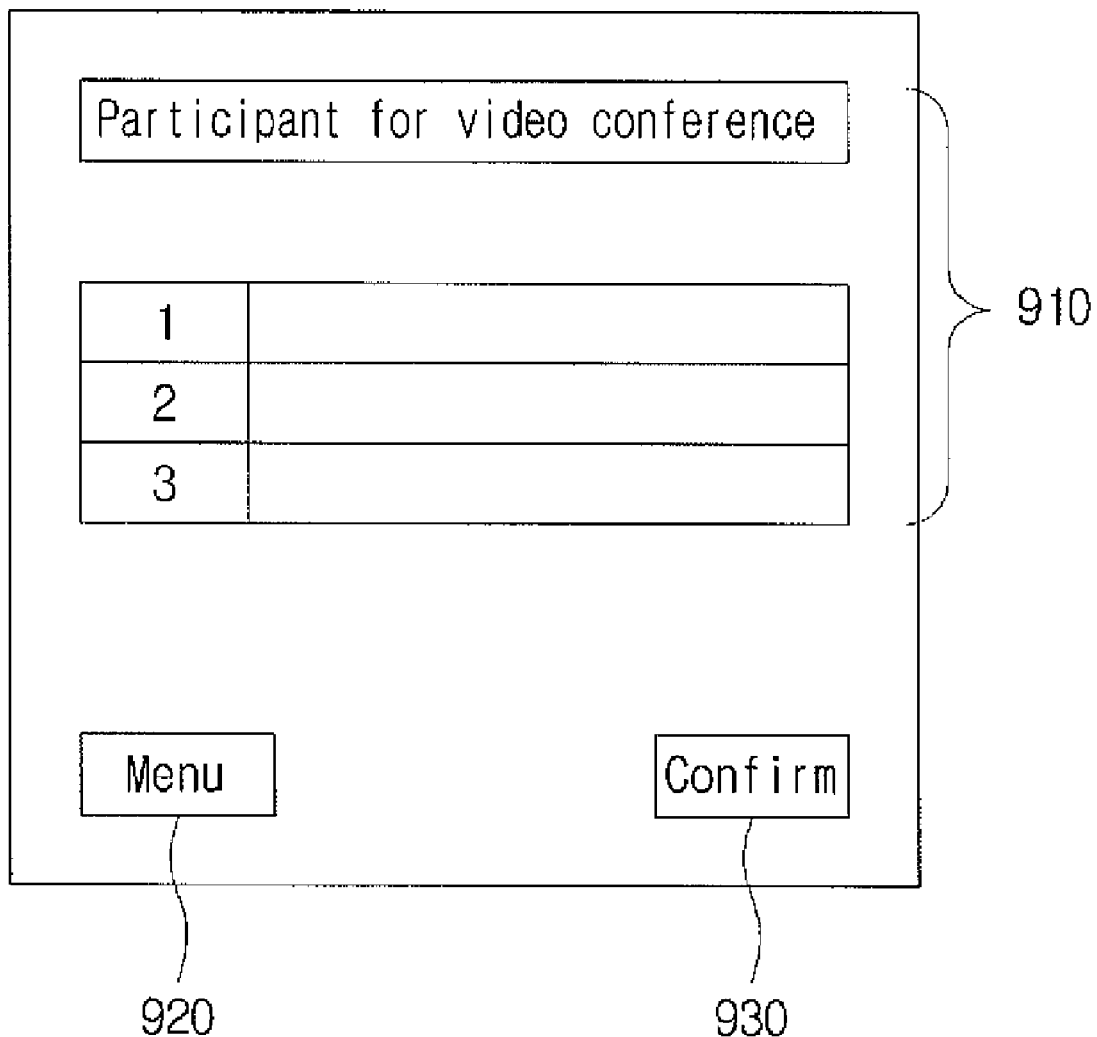
FIG. 10(a) is an example of a user interface screen in a video conference holding service mode, and (b) is an example of a menu structure shown in the video conference holding service mode, in accordance with one embodiment of the present invention.

Accordingly, as shown in FIG. 10 (a), the user interface screen of the video conference holding service mode displays a screen 910 selecting and inputting the video conference participants. As shown in FIG. 10(b), the menu provides a 'call history view' viewing previous call history stored in the mobile communication terminal 100 or a 'phone number list search' searching a phone number stored in the mobile communication terminal 100, for easy selection of the participants.

In accordance with the embodiment of the present invention, the mobile communication subscriber, who moderates the video conference, can simply select the participants by remembering all mobile identification numbers (MIN) of the participants' mobile communication terminal and selecting a menu item corresponding to the '1' to view the call history and to select the pertinent participant in the viewed call history without direct inputting or by selecting a menu item corresponding to the '2' to view the registered phone list and to select the pertinent participant.

The mobile communication terminal 100 receives the user interface menu forming information of the video conference holding mode and selects a participant by using the menu formed corresponding to the user interface menu forming information. Then, if the confirming button 930 is pushed in a step represented by S616, as illustrated in FIG. 10(a), participant information is transferred to the application service providing device 300 in the previously defined form in a step represented by S617.

The application service providing device 300 performs the processing of holding video conference, for example, transfers a video conference participating request message to the mobile communication terminal of the pertinent participant and informs the moderator's mobile communication terminal 100 of the corresponding response results of the respective mobile communication terminals in a step represented by S618. Also, the application service providing device 300 transmits the user interface menu forming information corresponding to the video conference busy line mode to the mobile communication terminal of the moderator who moderates the video conference in a step represented by S619.

The mobile communication terminal 100 forms the user interface menu to correspond to the received user interface menu forming information corresponding to the video conference busy line mode.

FIG. 11(a) indicates the user interface screen of the mobile communication terminal 100 in case that the video conference is in progress, and FIG. 11(b) illustrates a menu structure shown when a menu 1030 displayed on the user interface screen of FIG. 11(a). In case that the line is busy for the video conference, one of the video conference moderator and all participants and the other see their face images and communicate with each other by receiving and displaying the face images. At this time, it becomes necessary for the participant to use the functions such as a secret communication with a specific participant and a chatting instead of the function making it easy to select the participant. For the moderator, it also becomes necessary to use a speech restricting function as a controlling function for the progress of the video conference. Accordingly, in accordance with one embodiment of the present invention, as described above, the user interface menu 1030 can include at least one function of the 'secret communication' with a specific participant except for other participants, the 'speech restriction' restricting the voice of a specific participant to be transferred to the other participants and the 'chatting' exchanging a text massage with a specific participant, illustrated in FIG. 11(b), in the case of the video conference busy line mode, by changing the menu according to the service attribute notification.

Thus, the user can simply select a specific item in the menu in a step represented by S621, to thereby be able to inform the application service providing device 300 of the desired function in a step represented by S622. This is realized in a form that an input signal corresponding to the selected menu item is transmitted to the application service providing device 300. The application service providing device 300 performs the service corresponding to the input signal and provides the service to the user in a step represented by S623.

Figure 8:
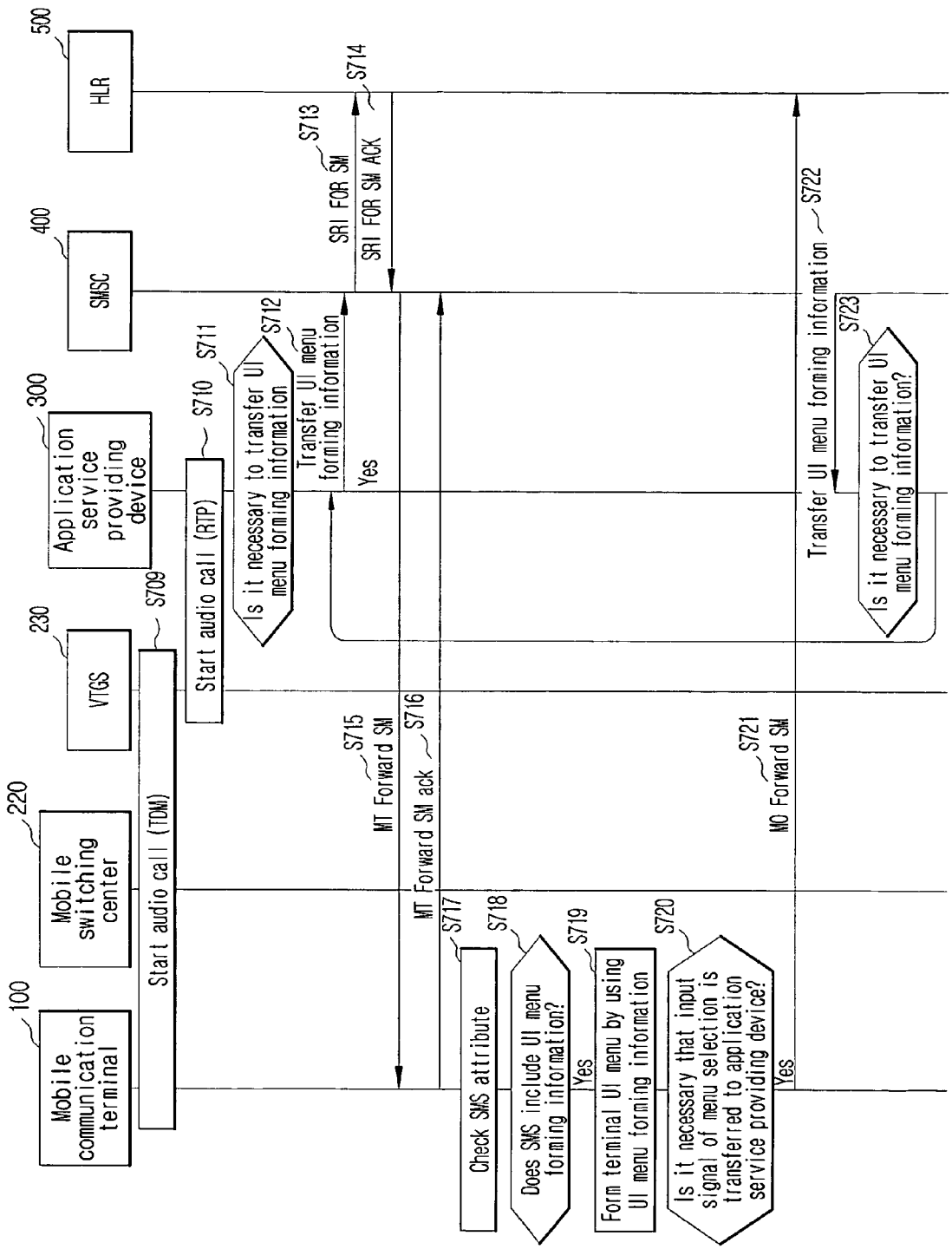
FIG. 8 is a flow chart illustrating a voice conference service operation in accordance with a second embodiment of the present invention.

FIG. 8 is a flow chart illustrating a voice conference service operation in accordance with a second embodiment of the present invention.

Since the voice call connecting operation of FIG. 8 is identical to that of the steps represented by S301 through S308 of FIG. 3(a), the pertinent description will be omitted to avoid the duplication.

A voice conference service is the service performing a conference through a voice multilaterally. In accordance with a second embodiment of the present invention, the voice conference service operation is similar to the video conference service operation of FIG. 7. However, the voice conference service operation transfers the user interface menu forming information and the input signal by using a short message service (SMS) differently from the video conference service operation.

If a voice call is connected between the mobile communication terminal 100 and the application service providing device 300 in a step represented by S710, the application service providing device 300 determines whether it is necessary to transfer user interface menu forming information in a step represented by S711.

As the result of determining it by the application service providing device 300, if it is necessary to transfer the user interface menu forming information, the application service providing device 300 transfers the user interface menu forming information to the short message service center (SMSC) 240 in a step represented by 712. The application service providing device 300 can also transfer the service attribute information according to the first embodiment of the present invention to the SMSC 240.

The SMSC 240 requests to the HLR 250 the routing information of the pertinent mobile communication terminal 100 that will transfer the user interface menu forming information and receives the corresponding response message in steps represented by S713 and S714.

The SMSC 240 transmits a short message by using the routing information of the pertinent mobile communication terminal 100 and receives the corresponding response message in steps represented by S715 and S716. Here, the short message includes the user interface menu forming information. It can be displayed that it is the short message notifying the user interface menu forming information by setting a specific field, for example, a protocol identifier (PID) field of header fields.

The mobile communication terminal 100 receives the short message from the SMSC 240 and checks the attribute of the short message in a step represented by S717. The mobile communication terminal 100 checks the attribute of the short message by analyzing data filed, for example, the PID field of the short message.

As the result of checking the attribute of the short message, the mobile communication terminal 100 checks that the short message includes the user interface menu forming information in a step represented by S718 and extracts the user interface menu forming information from the short message.

The mobile communication terminal 100 forms a user interface including the menu corresponding to the voice application service by using the extracted user interface menu forming information in a step represented by S719.

As described above, the mobile communication terminal 100 stores menu component data. In the case of receiving the user interface menu forming information, the mobile communication terminal 100 forms the user interface menu by extracting and combining the pertinent menu component data of the stored menu component data.

The mobile communication terminal 100 can receive an input signal of menu selection from a user through a user interface. In this case, the mobile communication terminal 100 determines whether it is necessary that the received input signal is transferred to the application service providing device 300 in a step represented by S720. If it is necessary for the received input signal to be transferred, the mobile communication terminal 100 makes the short message and transfers the short message to the SMSC 240 in a step represented by S721. Here, since the short message for transferring the input signal for selecting each menu is stored in the mobile communication terminal 100 in advance, the short message can be transferred to the SMSC 240 without additional manipulation at the same time, when the mobile communication terminal 100 selects the menu.

The SMSC 240 checks the attribute of the received short message. In the case of the short message for menu selection and transferring, the SMSC 240 transfers menu selection information to the application service providing device 300 in a step represented by S722.

The application service providing device 300 receives the menu selection information from the SMSC 240 and performs the corresponding service processing in a step represented by S723.

Figure 13:
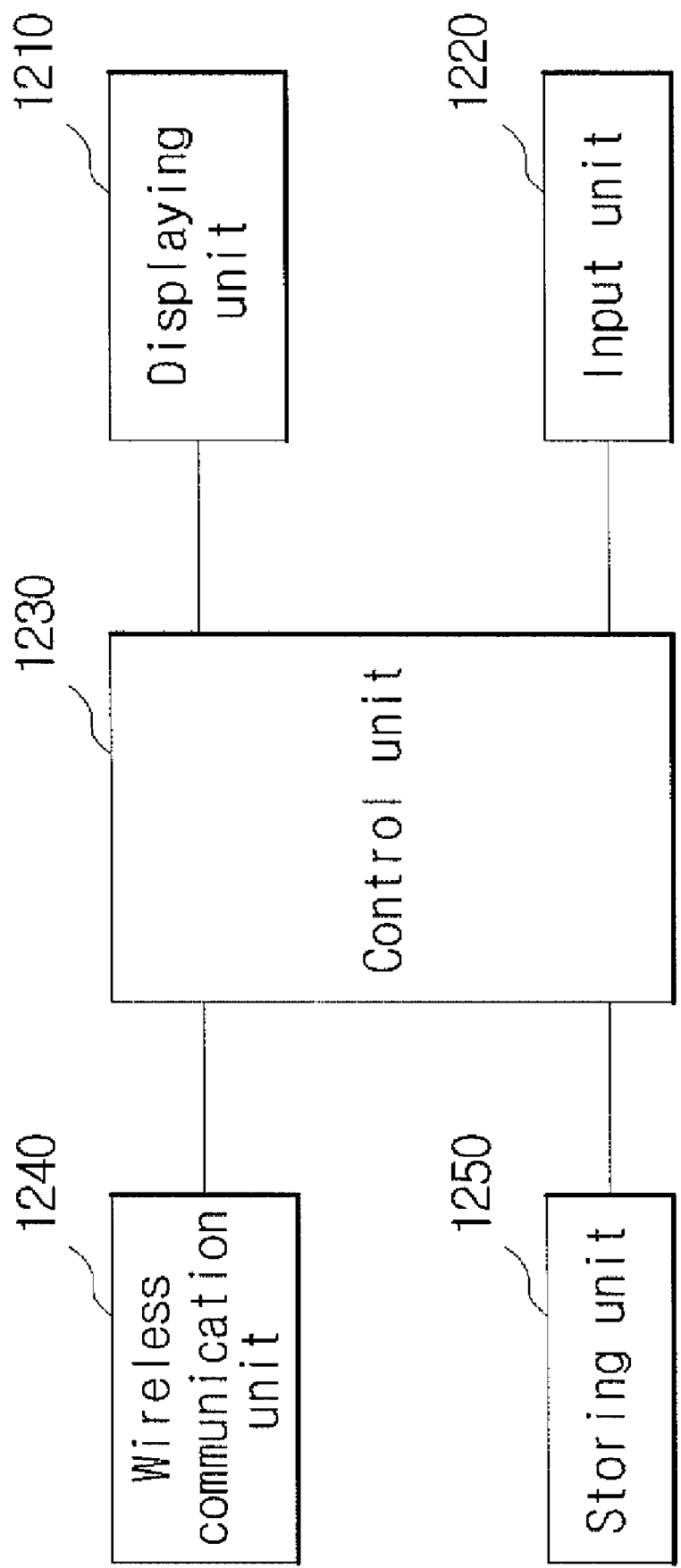
FIG. 13 is a block diagram illustrating a mobile communication terminal in accordance with one embodiment of the present invention.

FIG. 13 is a block diagram illustrating a mobile communication terminal in accordance with one embodiment of the present invention.

FIG. 13 illustrates a block diagram of the mobile communication terminal 100 in accordance with one embodiment of the present invention. Typically, the mobile communication terminal can further include a transmitting and receiving unit, a voice signal processing unit and an LED displaying unit. However, the below description relates to the only elements related to embodiments of the present invention and the description related to the other elements is omitted.

Referring to FIG. 13, the mobile communication terminal includes a displaying unit 1210, an input unit 1220, a control unit 1230, a wireless communication unit 1240 and a storing unit 1250.

The displaying unit 1210, which is means displaying a user interface screen according to the control of the control unit 1230, displays the user interface screen such as FIG. 8 *a*) and FIG. 8(*b*).

The input unit 1220, which consists of a plurality of input keys, can select a user's desired item in the menu displayed on the displaying unit 1210. Since the input unit 1220 is varied depending on the type of the mobile communication terminal, the input unit 1220 can include all devices for user's input.

In accordance with a first embodiment of the present invention, the wireless communication unit 1240, which is means communicating wireless data through the mobile communication system 200, provides a service attribute notifying message, transferred from the application service providing device 300, to the control unit 1230.

In accordance with a second embodiment of the present invention, the wireless communication unit 1240 receives user interface menu forming information or a short message from the application service providing device 300 and provides it to the control unit 1230.

In accordance with a first embodiment of the present invention, the storing unit 1250 stores menu information required per service attribute of an application service. At this time, the stored menu information includes at least one of a menu value, provided to the user per each service attribute, key information of the input unit 1220, corresponded to per each menu value, and some types of messages, transmitted to the application service providing device 300 when selected per each menu value.

In accordance with a second embodiment of the present invention, the storing unit 1250 can store menu component data for forming the user interface menu.

In accordance with a first embodiment of the present invention, the control unit 1230 changes and controls the pertinent user interface menu according to the service attribute of the application service received through the wireless communication unit 1240.

The control unit 1230 can search the menu information corresponding to the service attribute received from the wireless communication unit 1240 in the menu information pre-stored per service attribute in the storing unit 1250 and change the user interface menu provided as the menu information through the displaying unit 1210.

The formed mobile communication terminal, which has set and stored suitable menu information per service attribute in advance, can change the user interface menu according to the service attribute provided from the video application providing device, to thereby providing the appropriate menu per service attribute to the user. This can lead to the better promotion of convenience for the user who uses the application service.

In accordance with a second embodiment of the present invention, the control unit 1230 forms a pertinent user interface menu by using user interface menu forming information for providing the application service received through the wireless communication unit 1240. Here, the user interface menu forming information can be directly received through the wireless communication unit 1240 and can be included in a short message and be received.

In case that the user interface menu forming information is included in the short message and received, the control unit 1230 checks the attribute of the short message. Then, if it is determined that it is the short message for transferring the user interface menu forming information, the control unit 1230 can form the user interface menu by extracting the user interface menu forming information from the short message and combining the corresponding menu component data.

In case that the input key of the input unit 1220, corresponding to a menu, when the user interface screen is displayed, the control unit 1230 transmits a message in a form predetermined for the pertinent menu to the application service providing device 300 and transfers a user's request. Here, the message in the form predetermined for the pertinent menu can be transferred by using various methods that are varied depending on the application service type. For example, in the case of the voice application service providing device, the menu selection information can be transferred by using the SMS.

Figure 14:
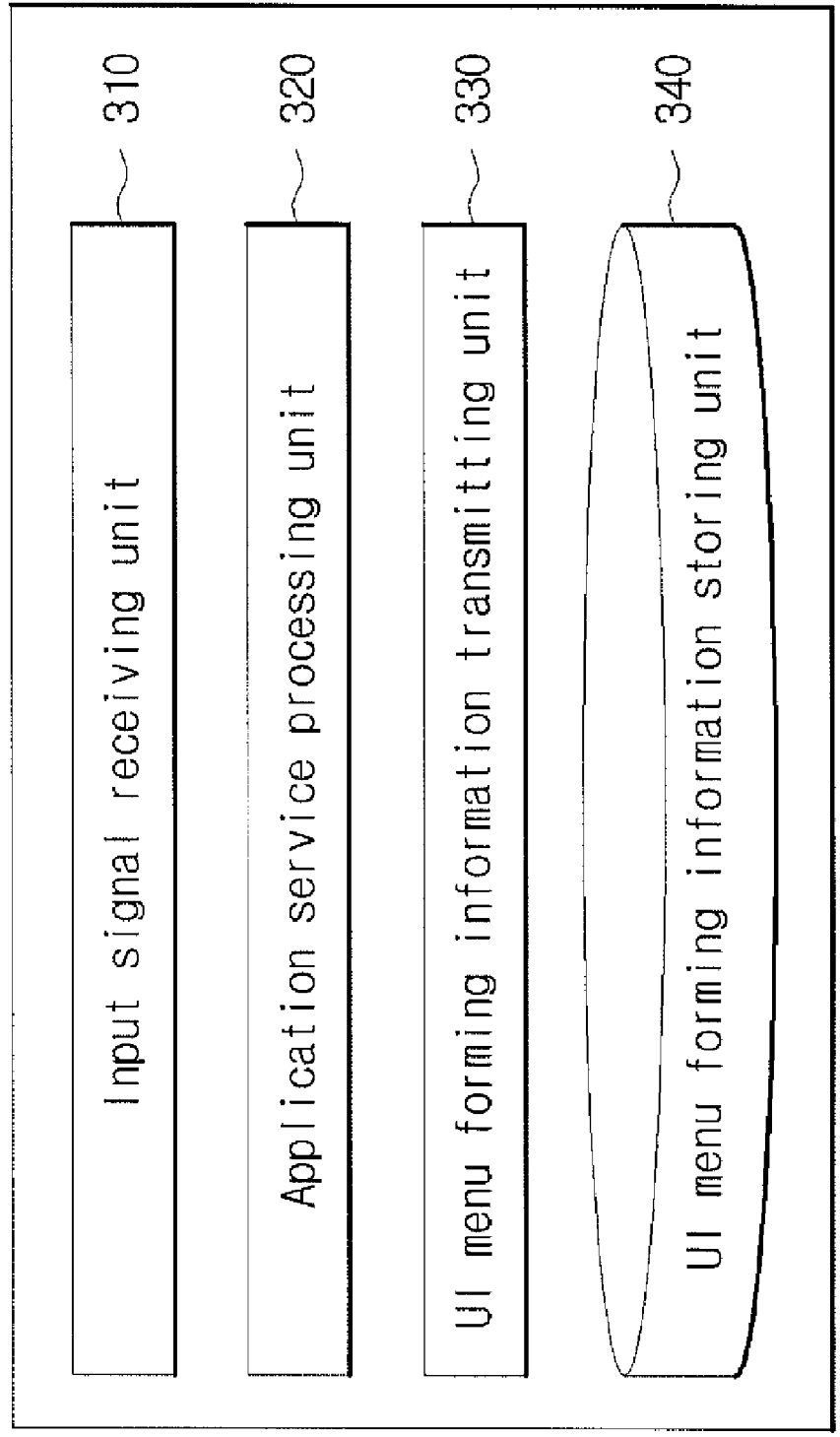
FIG. 14 is a block diagram illustrating a device for providing an application service in accordance with one embodiment of the present invention.

FIG. 14 is a block diagram illustrating a device for providing an application service in accordance.

In one embodiment, the application service providing device, which provides the application service capable of being used by the mobile communication terminal 100, can be a video application service providing device or a voice application service providing device.

The application service providing device 300 includes an input signal receiving unit 310, receiving an input signal of a user, an application service processing unit 320, processing the application service to provide the pertinent application service, a UI menu forming information transmitting unit 330, transmitting user interface menu forming information, and a UI menu forming storing unit 340, storing the user interface menu forming information varied depending on the application service.

The input signal receiving unit 310 receives an input signal inputted by user's selection in the mobile communication terminal 100. The input signal receiving unit 310 can receive from the mobile communication terminal 100 a video application service through the application service gateway 230 and a voice application service through the SMSC 240.

The application service processing unit 320 provides the pertinent application service according to an application service request of the user. The application service processing unit 320 processes various functions for providing various application services such as a video conference service, a video monitoring service and a voice conference service for example.

In the case of providing the corresponding service, the UI menu forming information transmitting unit 330 transmits service attribute information or user interface menu forming information such that the mobile communication terminal 100 can form a user interface menu, varied depending on service attribute.

The UI menu information forming transmitting unit 330 can transmit the service attribute information or the user interface menu forming information through the application service gateway 230 in the case of the video application service and through the SMSC 240 in the case of the video application service.

As described above, the mobile communication terminal 100 can form the user interface menu corresponding to the pertinent application service attribute in the case of receiving the service attribute information or the user interface menu forming information.

The UI menu forming information storing unit 340 stores the user interface menu forming information varied depending on the application service attribute.

In case that the application service is changed or a new application service is generated, the UI menu forming information storing unit 340 stores the corresponding user interface forming information. Although the user interface menu forming information related to the changed application service or the newly generated application service is not stored, the mobile communication service 100 can use the changed or newly generated application service by receiving the user interface menu forming information.

The application service providing service 300 can further include a user interface menu forming information transmitting determining unit (not shown) for determining whether to transmit the service attribute information or the user interface menu forming information, for checking the received user input signal and forming the user interface menu.

In the case of the voice conference service device, the application service providing device 300 can further include an SMS request signal transmitting unit (not shown) for transferring a short message including the user interface menu forming information to the mobile communication terminal.

As described above, at least one embodiment of the present invention can allow a menu to be changed depending on the service attribute of a provided application service without any change of a corresponding terminal's standard, to thereby promote the convenience of a user using the application service.

While the above description has pointed out novel features of the invention as applied to various embodiments, the skilled person will understand that various omissions, substitutions, and changes in the form and details of the device or process illustrated may be made without departing from the scope of the invention. Embodiments of the invention can also be applied to non-video data. Therefore, the scope of the invention is defined by the appended claims rather than by the foregoing description. All variations coming within the meaning and range of equivalency of the claims are embraced within their scope.

What is claimed is:

1. A method of controlling a user interface menu in a mobile communication terminal, which accesses an application service providing device via a mobile communication system and uses at least one type of application service, the method comprising:
    receiving a service attribute notifying message and user interface menu forming information from the application service providing device if a call is connected between the mobile communication terminal and the application service providing device via the mobile communication system and receiving another service attribute notifying message of one of a video conference service provided from a wideband code division multiple access (WCDMA) mobile communication system, a video monitoring service, a voice conference service and an ARS service for a disabled person from the application service providing device upon a change of the service attribute during the call;
    extracting menu component data corresponding to a set user interface menu if the menu forming information is received; and
    combining the extracted menu component data so as to form the user interface menu to be provided per service attribute,
    wherein the call is at least one of a voice call and an audio call.

2. The method of claim 1, further comprising storing menu component data, which is a command and function information of each menu forming the user interface menu, before receiving the user interface menu forming information.

3. The method of claim 1, further comprising allowing the set user interface menu forming information to be stored by the application service providing device before receiving the user interface menu forming information.

4. The method of claim 1, wherein if the application service providing device is a voice service providing device, the receiving of the user interface menu forming information comprises:
    requesting to transmit a short message including the menu forming information to a short message service center (SMSC) by way of the application service providing device;
    receiving the short message including the menu forming information from the SMSC;
    checking the attribute of the received short message;
    determining whether the short message includes the menu forming information based on checking the attribute of the short message; and
    extracting the menu forming information from the short message.

5. The method of claim 4, wherein the short message designates a specific data field and displays the attribute representing that the short message includes the menu forming information.

6. The method of claim 5, wherein the specific data field is a protocol identifier (PID) in a header fielder.

7. The method of claim 1, further comprising forming the user interface menu as a default menu if the menu forming information is not received from the application service providing device or if the menu forming information is received from the application service providing device but the menu component data corresponding to the received menu forming information is not stored.

8. The method of claim 1, wherein the attribute of the service, if the application service is the video conference service, comprises a video conference holding mode, being in operation for preparing a video conference, and a video conference busy line mode, being in operation of the video conference via a video telephony between participants.

9. The method of claim 8, wherein if the service attribute is the video conference holding mode, the user interface menu is formed by including at least one of a call history view, accessing a call history stored in the mobile communication terminal to select the participants, and a phone list search, accessing a phone list registered in the mobile communication terminal to select the participants.

10. The method of claim 8, wherein if the service attribute is the video conference busy line mode, the user interface menu is formed by including at least one of secret communication, communicating with an only specific participant except for other participants, speech restriction, restricting the voice of a specific participant to be transferred to the other participants, and chatting, exchanging a text massage with a specific participant.

11. The method of claim 1, wherein the attribute of the service, if the application service is the video monitoring service, comprises a video monitoring mode providing a monitoring video, gathered from the designated monitoring terminal, to the mobile communication terminal.

12. The method of claim 11, wherein if the service attribute is the video monitoring mode, the user interface menu is formed by including at least one of an expanding function, expanding a monitoring screen, a contracting function, contracting the monitoring screen, and a moving function, moving the monitoring screen in a specific direction such as left, light, upper and lower.

13. The method of claim 1, wherein the user interface menu per attribute of the service comprises a menu title, to be displayed on a screen of the mobile communication terminal, and a command and function information, performed when each menu title is selected.

14. A mobile communication terminal, comprising:
a wireless communication unit configured to i) request an application service to an application service providing device via a mobile communication system and ii) receive service data and a service attribute notifying message of one of a video conference service provided from a wideband code division multiple access (WCDMA) mobile communication system, a video monitoring service, a voice conference service and an ARS service for a disabled person from the application service providing device, wherein the service attribute notifying message is configured to notify the service attribute of the requested application service;
an input unit, including a plurality of input keys, configured to receive a user's selection and command;
a storing unit configured to store user interface menu data per service attribute of the application service and a command and function information to be performed corresponding to the pertinent menu title, wherein the user interface menu data comprises a menu title corresponding to each service attribute;
a control unit configured to i) search menu data corresponding to received service attribute in the storing unit upon receipt of the service attribute notifying message, ii) change the user interface menu in the terminal to the searched menu and iii) perform a function corresponding to the user interface menu selected according to the user's selection and command; and
a displaying unit configured to display the user interface screen, changed according to the control of the control unit, and the user interface menu,
wherein the application service providing device transmits the service attribute notifying message to the mobile communication terminal if a call is connected between the mobile communication terminal and the application service providing device via the mobile communication system and the application service providing device transmits another service attribute notifying message to the mobile communication terminal if the service attribute is changed during the call,
wherein the call is at least one of a voice call and an audio call.

15. The mobile communication terminal of claim 14, wherein the user interface menu stored in the storing unit comprises a user interface menu for a video conference holding mode including at least one of a call history view, accessing a call history stored in the mobile communication terminal to select the participants, and a phone list search, accessing a phone list registered in the mobile communication terminal to select the participants.

16. The mobile communication terminal of claim 14, wherein the user interface menu stored in the storing unit comprises a user interface menu for a video conference busy line mode including at least one of secret communication, communicating with an only specific participant except for other participants, speech restriction, restricting the voice of a specific participant to be transferred to the other participants, and chatting, exchanging a text massage with a specific participant.

17. The mobile communication terminal of claim 14, wherein the user interface menu stored in the storing unit comprises a user interface menu for a video conference mode including at least one of an expanding function, expanding a monitoring screen, a contracting function, contracting the monitoring screen, and a moving function, moving the monitoring screen in a specific direction such as left, light, upper and lower.

18. A mobile communication terminal, comprising:
a wireless communicator configured to i) request an application service to an application service providing device through a mobile communication system and ii) receive service data and user interface menu forming information corresponding to an attribute of one of a video conference service provided from a wideband code division multiple access (WCDMA) mobile communication system, a video monitoring service, a voice conference service and an ARS service for a disabled person of a provided service;
a receiver, comprising a plurality of input keys, configured to receive a user's selection and command;
a memory configured to store menu component data including a command and function information to be performed in a element of each menu to form a menu corresponding to each service attribute per service attribute of the application service;
a controller configured to i) extract the menu component data corresponding to received menu forming information upon receipt of the menu forming information, ii) form the user interface menu and iii) perform a function corresponding to the user interface menu selected according to the user's selection and command; and
a display configured to display the formed user interface menu,
wherein the application service providing device transmits the service attribute notifying message to the mobile communication terminal if a call is connected between the mobile communication terminal and the application service providing device via the mobile communication system and the application service providing device transmits another service attribute notifying message to the mobile communication terminal if the service attribute is changed during the call,
wherein the call is at least one of a voice call and an audio call.

19. The terminal of claim 18, wherein if the application service is the voice conference service,
the wireless communicator is further configured to receive a short message including the menu forming information through a short message service center (SMSC), and
the controller is further configured to i) check the attribute of the short message, upon determination that the short message includes the menu forming information, and ii) extract the menu forming information from the short message to form the user interface menu.

20. The terminal of claim 14, wherein the user interface menu is displayed on a pop-up window in a part of a screen of the display.

21. A method of controlling a user interface menu for providing an application service in an application service providing device, which provides the application service to a mobile communication terminal via a mobile communication system, the method comprising:
- classifying a service attribute of one of a video conference service provided from a wideband code division multiple access (WCDMA) mobile communication system, a video monitoring service, a voice conference service and an ARS service for a disabled person per type of the application service and per operating modes of each service;
- connecting a call between the application service providing device and the mobile communication terminal in accordance with a call request from the mobile communication terminal;
- receiving a service request from a mobile communication terminal through the connected call;
- checking the service attribute corresponding to the call request from the mobile communication terminal; and
- transmitting information, related to the service attribute and user interface menu forming information corresponding to the service attribute, to the mobile communication terminal,
- wherein the application service providing device transmits the service attribute notifying message to the mobile communication terminal if a call is connected between the mobile communication terminal and the application service providing device via the mobile communication system and the application service providing device transmits another service attribute notifying message to the mobile communication terminal if the service attribute is changed during the call,
- wherein the call is at least one of a voice call and an audio call.

22. A method of controlling a user interface menu for providing an application service in an application service providing device, which provides the application service to a mobile communication terminal via a mobile communication system, the method comprising:
- classifying a service attribute of one of a video conference service provided from a wideband code division multiple access (WCDMA) mobile communication system, a video monitoring service, a voice conference service and an ARS service for a disabled person per type of the application service and per operating mode of each service;
- storing user interface menu forming information corresponding to the service attribute;
- connecting a call between the application service providing device and the mobile communication terminal in accordance with a call request from the mobile communication terminal;
- receiving a service request from a mobile communication terminal through the connected call;
- checking the service attribute corresponding to the call request from the mobile communication terminal; and
- transmitting the user interface menu forming information corresponding to the service attribute to the mobile communication terminal,
- wherein the application service providing device transmits the service attribute notifying message to the mobile communication terminal if a call is connected between the mobile communication terminal and the application service providing device via the mobile communication system and the application service providing device transmits another service attribute notifying message to the mobile communication terminal if the service attribute is changed during the call,
- wherein the call is at least one of a voice call and an audio call.

23. The method of claim 21, wherein if the application service is a voice conference service, a short message including the information related to the service attribute and the user interface menu forming information corresponding to the service attribute is transmitted to the mobile communication terminal.

24. An application service providing device, which provides at least one type of application service to a mobile communication terminal via a mobile communication system, the device comprising:
- a receiver configured to receive an input signal of a user from the mobile communication terminal;
- a processor configured to provide the application service corresponding to the input signal; and
- a transmitter configured to transmit service attribute information and user interface menu forming information per attribute of one of a video conference service provided from a wideband code division multiple access (WCDMA) mobile communication system, a video monitoring service, a voice conference service and an ARS service for a disabled person, wherein the user interface menu forming information is configured to form a user interface menu on the mobile communication terminal,
- wherein the application service providing device transmits the service attribute notifying message to the mobile communication terminal if a call is connected between the mobile communication terminal and the application service providing device via the mobile communication system and the application service providing device transmits another service attribute notifying message to the mobile communication terminal if the service attribute is changed during the call,
- wherein the call is at least one of a voice call and an audio call.

25. The device of claim 24, further comprising a user interface menu forming information transmitting determining unit configured to i) determine whether to transmit the service attribute information or the user interface menu forming information, ii) check the received user input signal and iii) form the user interface menu.

26. The device of claim 24, further comprising a database configured to store the user interface menu forming information corresponding to the service attribute of the application service.

27. The device of claim 24, further comprising a short message service (SMS) request signal transmitting unit configured to transfer a short message including the user interface menu forming information to the mobile communication terminal if the application service providing device is a voice conference service device.

28. One or more processor-readable storage devices having processor-readable code, the processor-readable code which, when executed by one or more processors, performs a method of controlling a user interface menu in a mobile communication terminal, which accesses an application service providing device through a mobile communication system and uses at least one type of application service, the method comprising:

setting a user interface menu to be provided when a pertinent application service is selected per service attribute of one of a video conference service provided from a wideband code division multiple access (WCDMA) mobile communication system, a video monitoring service, a voice conference service and an ARS service for a disabled person provided to the mobile communication terminal;

receiving a service attribute notifying message from the application service providing device upon connection of a call between the mobile communication terminal and the application service providing device via the mobile communication system and receiving another service attribute notifying message from the application service providing device upon a change of the service attribute during the call, wherein the service attribute notifying messages are configured to notify the service attribute of the requested application service;

searching a menu corresponding to the received service attribute among the menus per set service attribute upon receipt of the service attribute notifying message; and changing the user interface menu to the searched menu, wherein the call is at least one of a voice call and an audio call.

29. One or more processor-readable storage devices having processor-readable code, the processor-readable code which, when executed by one or more processors, performs a method of controlling a user interface menu in a mobile communication terminal, which accesses an application service providing device via a mobile communication system and uses at least one type of application service, the method comprising:

receiving a service attribute notifying message and user interface menu forming information from the application service providing device upon connection of a call between the mobile communication terminal and the application service providing device via the mobile communication system and receiving another service attribute notifying message of one of a video conference service provided from a wideband code division multiple access (WCDMA) mobile communication system, a video monitoring service, a voice conference service and an ARS service for a disabled person from the application service providing device upon a change of the service attribute during the call;

extracting menu component data corresponding to a set user interface menu based on the user interface menu forming information; and combining the extracted menu component data so as to form the user interface menu to be provided per the service attribute, wherein the call is at least one of a voice call and an audio call.

30. An apparatus for controlling a user interface menu in a mobile communication terminal, which accesses an application service providing device via a mobile communication system and uses at least one type of application service, the apparatus comprising:

means for setting a user interface menu, to be provided when a pertinent application service is selected, per service attribute of one of a video conference service provided from a wideband code division multiple access (WCDMA) mobile communication system, a video monitoring service, a voice conference service and an ARS service for a disabled person, of application services provided to the mobile communication terminal;

means for receiving a service attribute notifying message from the application service providing device upon connection of a call between the mobile communication terminal and the application service providing device via the mobile communication system and receiving another service attribute notifying message from the application service providing device upon a change of the service attribute during the call, wherein the service attribute notifying messages are configured to notify the service attribute of the pertinent application service;

means for searching a menu corresponding to the received service attribute upon receipt of the service attribute notifying message; and means for changing the user interface menu to the searched menu, wherein the call is at least one of a voice call and an audio call.

31. A method of controlling a user interface menu in a mobile communication terminal, which accesses an application service providing device via a mobile communication system and uses at least one type of application service, the method comprising:

setting a user interface menu, to be provided when a pertinent application service is selected, per service attribute of application services provided to the mobile communication terminal, wherein each of the application services is one of a video conference service provided from a wideband code division multiple access (WCDMA) mobile communication system, a video monitoring service, a voice conference service and an ARS service for a disabled person;

receiving a service attribute notifying message from the application service providing device upon connection of a call between the mobile communication terminal and the application service providing device via the mobile communication system and receiving another service attribute notifying message from the application service providing device upon a change of the service attribute during the call, wherein the service attribute notifying messages are configured to notify the service attribute of the pertinent application service;

searching a menu corresponding to the received service attribute upon receipt of the service attribute notifying message; and changing the user interface menu to the searched menu, wherein the call is at least one of a voice call and an audio call.

* * * * *